(12) United States Patent
Takahashi et al.

(10) Patent No.: US 6,607,444 B2
(45) Date of Patent: Aug. 19, 2003

(54) SERVER DEVICE FOR NET GAME, NET GAME MANAGEMENT METHOD, NET GAME MANAGEMENT PROGRAM, AND RECORDING MEDIUM WHICH STORES NET GAME MANAGEMENT PROGRAM

(75) Inventors: Hidehisa Takahashi, Amagasaki (JP); Tatsuya Ishikawa, Takarazuka (JP); Kazuhiro Namba, Amagasaki (JP)

(73) Assignee: Konami Computer Entertainment Osaka, Inc., Osaka (JP)

( * ) Notice: Subject to any disclaimer, the term of this patent is extended or adjusted under 35 U.S.C. 154(b) by 0 days.

(21) Appl. No.: 10/157,583

(22) Filed: May 28, 2002

(65) Prior Publication Data

US 2002/0183113 A1 Dec. 5, 2002

(30) Foreign Application Priority Data

May 29, 2001 (JP) ........................................ 2001-161341

(51) Int. Cl.$^7$ ............................ A63F 13/00; A63F 9/24; G06F 17/00; G06F 19/00; G06F 155/00
(52) U.S. Cl. ............................. 463/42; 463/40; 463/41; 700/92
(58) Field of Search ............................ 463/1–8, 23, 24, 463/40–42

(56) References Cited

U.S. PATENT DOCUMENTS

| | | | | |
|---|---|---|---|---|
| 5,971,397 A | * | 10/1999 | Miguel et al. | 273/371 |
| 6,119,229 A | | 9/2000 | Martinez et al. | |
| 6,203,433 B1 | * | 3/2001 | Kume | 463/41 |
| 6,358,151 B1 | * | 3/2002 | Enzminger et al. | 463/42 |
| 6,406,371 B1 | * | 6/2002 | Baba et al. | 463/42 |
| 6,425,011 B1 | * | 7/2002 | Otani et al. | 709/225 |
| 6,425,828 B2 | * | 7/2002 | Walker et al. | 463/23 |

FOREIGN PATENT DOCUMENTS

| | | |
|---|---|---|
| EP | 1 078 667 | 2/2001 |
| JP | 2001-120841 | 5/2001 |
| WO | WO 95/31061 | 11/1995 |
| WO | WO 97/19537 | 5/1997 |
| WO | WO 00/29084 | 5/2000 |

* cited by examiner

Primary Examiner—Valencia Martin-Wallace
(74) Attorney, Agent, or Firm—Jordan and Hamburg LLP

(57) ABSTRACT

The present invention provides a server device for net games, which can sufficiently give users a sense of accomplishment as a winner and higher excitement without greatly diminishing the advantages of net games. A server system 1 designates league members from a plurality of members who register to a normal pennant using a client computer 2, sequentially creates normal leagues consisting of the designated league members, and decides the game schedule of each created normal league.

7 Claims, 22 Drawing Sheets

SERVER DEVICE FOR NET GAME, NET GAME MANAGEMENT METHOD, NET GAME MANAGEMENT PROGRAM, AND RECORDING MEDIUM WHICH STORES NET GAME MANAGEMENT PROGRAM

BACKGROUND OF THE INVENTION

1. Field of the Invention

The present invention relates to a server device for net games (or network games) which is communicably connected via a network to a plurality of terminal devices used by users so that the users manage a game played in a game space using the terminal devices, and relates to a net game management method, a net game management program used for this device and a recording medium which stores a net game management program.

2. Description of the Related Art

Today as the Internet becomes popular and data transfer speeds increase, net games using server devices for net games and terminal devices used by users, which are connected via the Internet, are commonly played. Various competitive games (or matching games), including sports and physical combat, are played as such net games.

In the case of the aforementioned competitive games, an unspecified number of users can participate as players in a game since the Internet is used. When unknown users compete in this way, the capability of an opponent in a game is unknown, so unexpectedness is added to the progress of a game, and some excitement can be added to a game compared with normal games which use a standalone game device, where a game is played with the game device as the opponent.

However, when a game is simply played with an unspecified number of players, as mentioned above, each game to be played is temporal. So even if a user wins a game, it simply means that the user won against an unknown opponent once, and the user cannot be sufficiently immersed in the feeling of accomplishment as a winner. Also when various strategies are planned to win a game, complicated strategies with variation based on a long term view cannot be used since the target game is temporal, so the user cannot experience sufficient excitement.

In the real world, in baseball for example, the A League and the B League, which are comprised of six teams respectively, are formed, and in each league, league baseball games are conducted for a predetermined number of games among teams according to a predetermined schedule. In such league baseball games, games are continuously played for a predetermined period, so games become more interesting and attract more attention from many people compared with a single game.

However, if the configuration of the aforementioned actual leagues is applied to net games as is, then only six teams each in two leagues, that is only 12 users, can participate in the game, thereby diminishing the advantage of net games where many users can participate in the game.

SUMMARY OF THE INVENTION

To solve the above problem, it is an object of the present invention to provide a server device for net games which can sufficiently give a user a sense of accomplishment as a winner and offer a higher level of excitement without greatly diminishing the advantages of net games, and to provide a net game management method and a net game management program using this device.

The present invention relates to a server device for net games which is communicably connected via a network to a plurality of terminal devices used by users, and manages a game played in a game space by the users using these terminal devices, comprising: league creating means for designating as league members a predetermined number of users from a plurality of users using the terminal devices and sequentially creating a league which consists of the designated league members; and schedule deciding means for deciding the schedule of league matches so that each league member of the league created by the league creating means can play at least game with all the other league members.

According to the aforementioned structure, the server device for network games, which is communicably connected via a network to a plurality of terminal devices used by users and manages a game played in a game space by the users using the terminal devices, comprises league creating means for designating a predetermined number of users from a plurality of users using the terminal devices as league members, and sequentially creating a league which consists of the designated members, and schedule deciding means for deciding the schedule of league matches so that each member of the league created by the league creating means can play a game with all the other members at least once.

In other words, a predetermined number of users are designated as league members from a plurality of users using the terminal devices, a league which consists of the designated members is sequentially created, and the schedule of league matches is decided so that each member of the created league plays a game with all the other members at least once. In this way, a league is sequentially created for a plurality of users, so many users can participate in one of these leagues. Also the schedule of league baseball games is decided so that each league member can play a game with all the other league members at least once, so the user to be a member of the league can continuously play games according to the schedule of the league matches. Therefore the user can use complicated strategies with variation considering a plurality of games to be played continuously. Also the opponents are limited to league members who belong to the same league rather than unspecified opponents who differ from game to game, so the user can play a plurality of games with opponents specified as members of the league.

These and other objects, features and advantages of the present invention will become more apparent upon reading the following detailed description along with the accompanied drawings.

DESCRIPTION OF THE PREFERRED EMBODIMENTS

Figure 1:
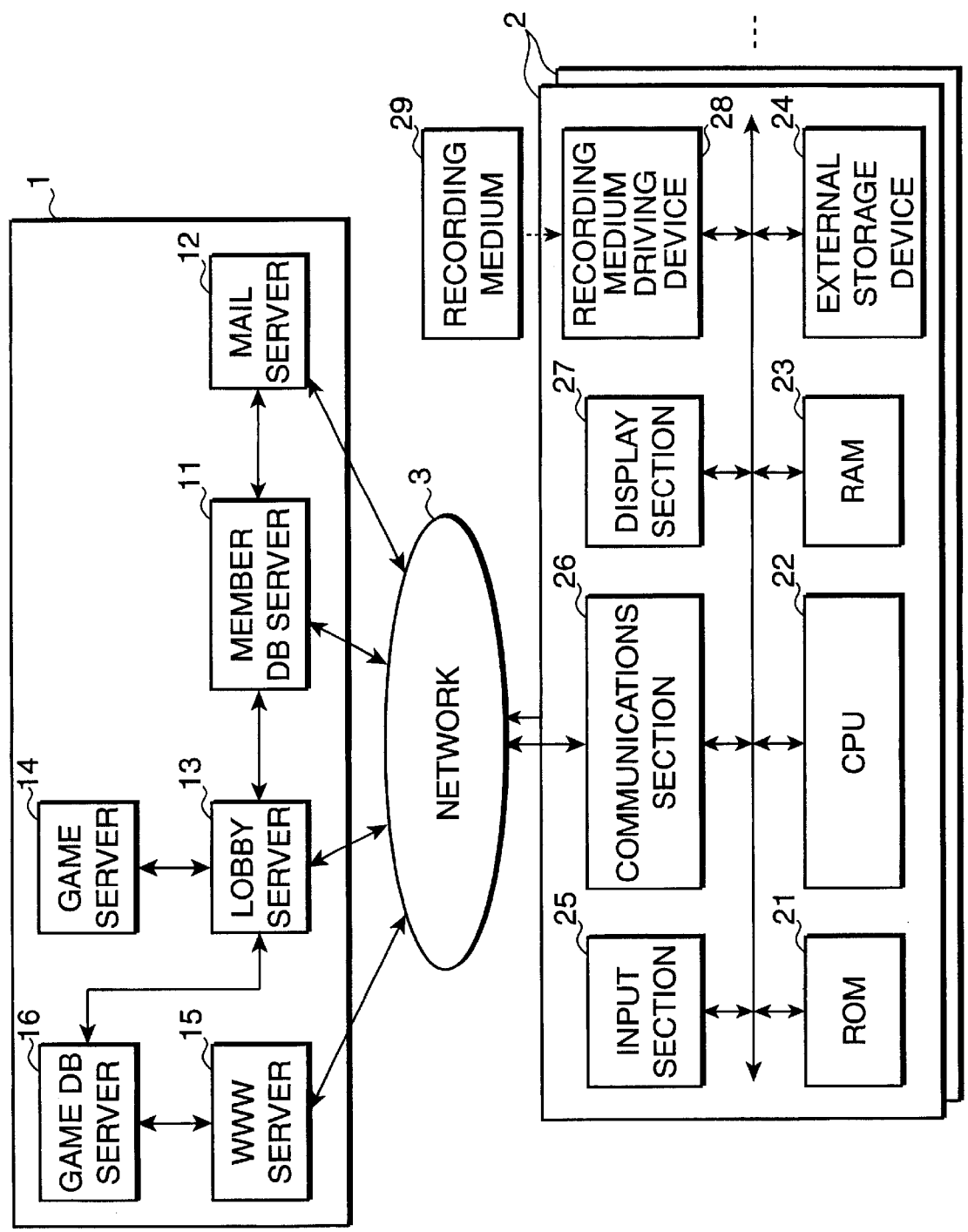
FIG. 1 is a block diagram depicting a configuration of a net game system using a server system according to an embodiment of the present invention.

A net game system using a server system according to an embodiment of the present invention will now be described with reference to the accompanying drawings. FIG. 1 is a block diagram depicting a configuration of the net game system using the server system according to an embodiment of the present invention.

In the following description, a baseball game in which a plurality of pre-registered members form a league and play league matches is described as an example of a net game (or a network game), but the present invention is not limited by this example and can be suitably used for such sport games as soccer, volleyball and basketball, in which a league is formed and matches are played, and can also be applied to other games as long as a league is formed and matches are played.

The net game system shown in FIG. 1 comprises a server system 1 and a plurality of client computers 2. The server system 1 and the plurality of client computers 2 are communicably inter-connected via a network 3. Each client computer 2 is a terminal device used by a member user, and the server system 1 is a server device for net games in which a member manages a baseball game played in a game space using the client computer 2.

The Internet, for example, is used as the network 3, and various information and the like is transmitted and received between the server system 1 and the client computers 2 according to TCP/IP (Transmission Control Protocol/Internet Protocol). The network 3 is not limited to the Internet, but another network, such as an intranet, or a network combining various networks including the Internet and an intranet may be used. The server system 1 and client computers 2 may be inter-connected by a leased line.

When the Internet is used as the network 3, each client computer 2 is usually connected to a predetermined provider server via a modem, and is connected to the network 3 via this provider server, but to simplify description, the provider server is not illustrated and not described here.

In the present embodiment, the user who uses a client computer 2 is a member who has registered to receive a predetermined service provided by a company which manages the net game, and can register to the pennant managed by the server system 1 using the client computer 2.

Here in the present embodiment, a baseball game is played as the net game, and pennant means a league match which is a contest for a championship flag (pennant). Pennants have a normal pennant and a friend pennant. A normal pennant is a league match played by normal leagues for which members are automatically decided by the server system 1. A friend pennant is a league match played in a limited membership league created by the server system 1 so that only members who know a password, which is a creation keyword used for creating a friend pennant become members of the league.

Each member accesses the server system 1 using a client computer 2 in accordance with the game schedule of the registered normal pennant and friend pennant, and plays a league match in a game space constructed by the server system 1 and the client computers 2, similarly to a normal baseball game.

The server system 1 will now be described in detail. The server system 1 comprises a member DB (data base) server 11, mail server 12, lobby server 13, game server 14, WWW (World Wide Web) server 15, and game DB server 16. Each server is connected by a predetermined network such as a LAN (Local Area Network), so that data can be transmitted and received according to the illustrated paths. The member DB server 11, mail server 12, lobby server 13 and WWW server 15 are connected to the network 3 via a communications device such as a router (not illustrated), for example.

The member DB server 11 is comprised of a normal data base server device, and executes member registration processing for a user when the user registers for membership to receive a predetermined service provided by the company managing the network game. The member DB server 11 stores for each member the member ID, password, accounting information, and so on, which are determined at the time of membership registration in the data base, and manages this information.

The mail server 12 is comprised of a normal mail server device, and sends various electronic mail to members according to instructions from another server. For example, the mail server 12 sends the game schedule of a normal pennant and friend pennant by electronic mail to each member registered in the normal pennant and friend pennant. The mail server 12 uses the electronic mail addresses which the sponsor-member of the friend pennant sends along with a password, and sends the password by electronic mail to the other members who this member wishes to have participate in the friend pennant.

The lobby server 13 is comprised of a normal server device, and executes various lobby processing as a portal site to play net games. For example, when a member accesses using the client computer 2 to play a net game, the lobby server 13 executes authentication processing for the member who accessed, referring to the member ID and password stored in the member DB server 11. The lobby server 13 also executes normal pennant registration processing and friend pennant registration processing for the member to register in the normal pennant and friend pennant.

When a member who registered in a normal pennant or friend pennant accesses using the client computer 2 to play a game, the lobby server 13 performs guidance processing to guide the member to the pennant lobby where the normal pennant and friend pennant are played from a plurality of lobbies, and to guide the member to the league where the member plays a game from the pennant lobby to which the member was guided.

The game server 14 is comprised of a normal server device, and performs net game progression processing for expediting the net game in a game space where the members play a game. At this time, the game server 14 transmits and receives data required for the progression of the net game to and from the client computer 2 via the lobby server 13.

The game DB server 16 is comprised of a normal data base server device, stores various kinds of information on the net game in the data base, such as game outcome, which the client computer 2 sends via the lobby server 13, and manages this information.

The game DB server 16 also stores various kinds of information on the normal pennant and friend pennant in the data base, and manages this information. For example, the game DB server 16 stores the password for creating the friend pennant which the member sends using the client computer 2 and the password for cancellation, which is a canceling keyword used for canceling the friend pennant.

The WWW server 15 is comprised of a normal WWW server device, creates ranking data and the like from the game outcomes data stored in the game DB server 16, and lists the created ranking data on a predetermined home page so that the ranking data can be read from the client computer 2.

The client computer 2 will now be described in detail. Each client computer 2 is comprised of a normal personal computer, which includes a ROM (Read Only Memory) 21, CPU (Central Processing Unit) 22, RAM (Random Access Memory) 23, external storage device 24, input section 25, communications section 26, display section 27, and recording medium driving device 28.

Each block of the client computer 2 is connected to an internal bus, various data is inputted and outputted onboard the client computer 2 via this bus, and various processings for playing the net game are executed under the control of the CPU 22.

A basic program for operating the client computer 2 is stored in the ROM 21. The RAM 23 is used as the work area of the CPU 22. The recording medium 29 is a recording medium which can be read by a computer, such as a CD-ROM. The CD-ROM is provided by a software manufacturer who creates net games, and stores the game progression program on the client side for a member to play a baseball game in a game space.

The recording medium driving device 28 is comprised of a CD-ROM drive, where the game progression program at the client side is read from the recording medium 29 under the control of the CPU 22, and the game progression program at the client side is installed in the external storage device 24 if necessary.

The recording medium 29 is not limited to the aforementioned example, and if another recording medium driving device, such as a DVD drive, floppy disk drive or the like is added, the game progression program and the like on the client side may be installed in the external storage device using another recording medium which the computer can read, such as a DVD or floppy disk. If the game progression program on the client side can be downloaded from a home page of a software manufacturer via the network 3, then the game progression program on the client side may be directly downloaded from this home page to the external storage device 24.

The external storage device 24 is comprised of an external storage device such as a hard disk drive. In the external storage device 24, the game progression program on the client side is installed as mentioned above, and various programs, including a browser program used for reading Web contents on the Web and a moving picture reproducing program for reproducing 3-dimensional moving pictures according to the game progression program, are pre-installed by a normal method.

For the browser program here, Internet Explorer by Microsoft, for example, can be used. For the moving picture reproducing program, DirectX by Microsoft, for example, can be used.

The CPU 22 reads the basic program from the ROM 21, and reads the game progression program and moving picture reproducing program on the client side from the external storage deice 24, executes game progression processing for playing a normal pennant or friend pennant, and transmits and receives necessary data to and from the server system 1 using the communications section 26.

The CPU 22 reads the browser program from the external storage device 24, executes game progression processing on the client side for registering a normal pennant and friend pennant using the game progression program and browser program, and transmits and receives necessary data to and from the server system 1 using the communications section 26.

The input section 25 is comprised of a keyboard and mouse, and in the present embodiment, various instructions are input primarily using the mouse according to member operations. The communications section 26 is comprised of a modem or a router, and controls communication with the server system 1 via the network 3. The display section 27 is comprised of a CRT (Cathode Ray Tube) or liquid crystal display device, and displays various screens used for a net game as still pictures or moving pictures under the control of the CPU 22.

Figure 2:
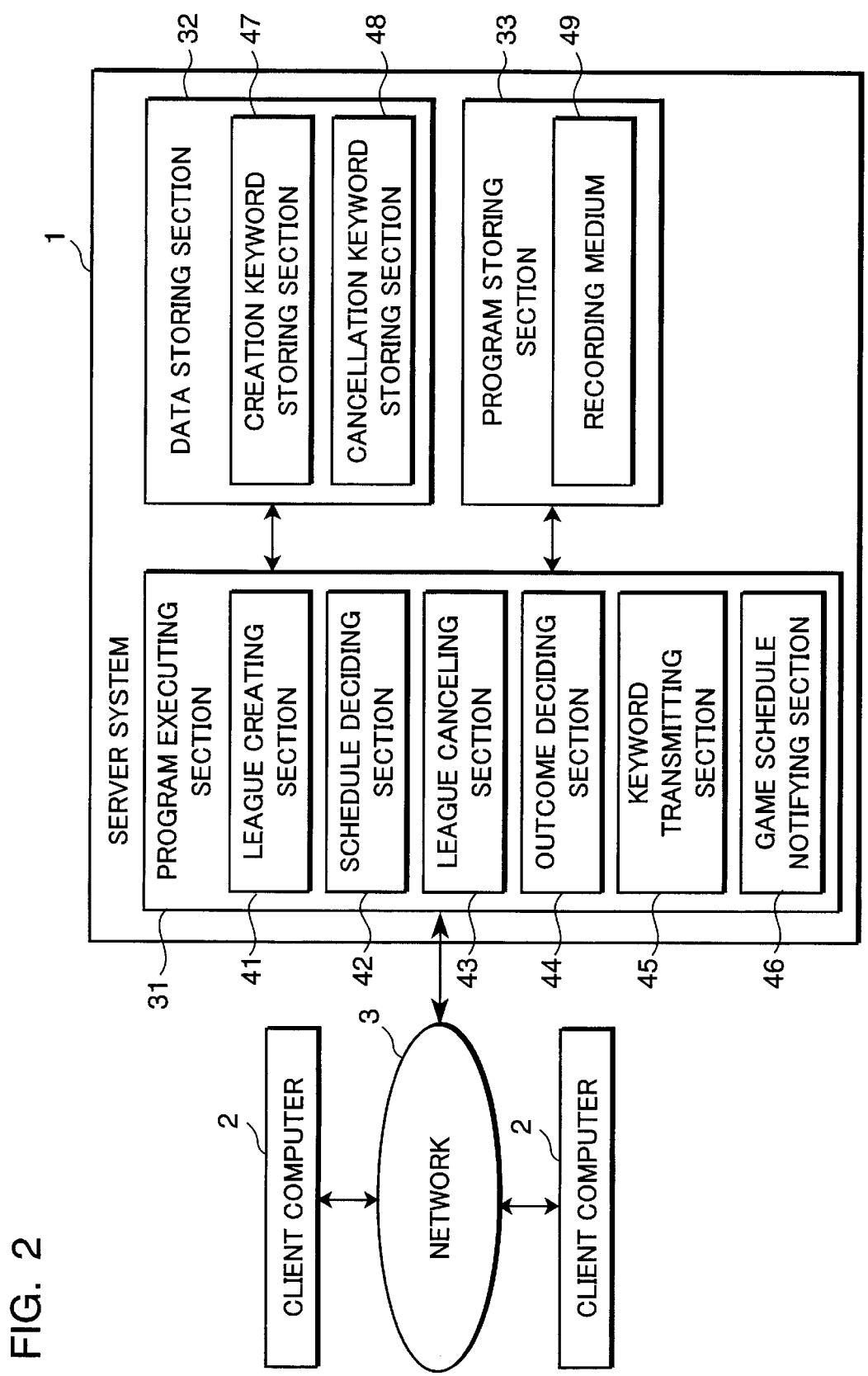
FIG. 2 is a block diagram depicting the major functions of the server system shown in FIG. 1.

The major functions of the server system 1 configured as above will now be described. FIG. 2 shows the major functional blocks of the server system 1 shown in FIG. 1.

As FIG. 2 shows, the server system 1 functionally includes a program executing section 31, data storing section 32, and program storing section 33. The program executing section 31 functionally includes a league creating section 41, schedule deciding section 42, league canceling section 43, outcome deciding section 44, keyword transmitting section 45, and game schedule notifying section 46. The data storing section 32 functionally includes a creation keyword storing section 47, and canceling keyword storing section 48. The program storing section 33 functionally includes a recording medium 49 which can be read by a computer.

The program executing section 31 is comprised of the CPUs (not illustrated) of each server 11–16 constituting the server system 1, and these CPUs function as the league creating section 41, schedule deciding section 42, league canceling section 43, outcome deciding section 44, keyword transmitting section 45, and game schedule notifying section 46 by executing various programs stored in the recording medium 49.

The data storing section 32 is comprised of the game DB server 16, where the creation keyword storing section 47 stores a password which is a creation keyword which a member sends using the client computer 2. The canceling keyword storing section 48 stores a password for cancellation, which is a canceling keyword which a member sends using the client computer 2.

The program storing section 33 is comprised of the hard disk drives (not illustrated) of each server 11–16 of the server system 1, and in this case the recording medium 49 is comprised of a hard disk and the like. The recording medium 49 records, as a net game management program, the normal pennant registration program, normal pennant creation program, friend pennant creation program, friend pennant registration program, friend pennant schedule notification program, friend pennant cancellation program, outcome decision program, and other game progression programs at the server side in a state, which the computer can read.

The recording medium 49 is not limited to the aforementioned example, but another recording medium which can be read by a computer, such as a CD-ROM, DVD and floppy disk may be used when another recording medium driving device, such as a CD-ROM drive, DVD drive and floppy disk drive, is installed, and each of the aforementioned programs may be downloaded and stored in a hard disk via the network 3.

The league creating section 41 is implemented primarily by the CPU of the lobby server 13 executing the normal pennant registration program, normal pennant creation program, friend pennant creation program, and friend pennant registration program.

The league creating section 41 designates as league members a predetermined number of individuals, 6 or 3, out of a plurality of members who access using the client computer 2, and sequentially creates a normal league and limited membership league which consists of the designated league members. Also, when the league creating section 41 creates a limited membership league, the league creation section 41 creates the limited membership league so that only the members who send a password which matches the password stored in the creation keyword storing section 47 become league members.

The schedule deciding section 42 is implemented primarily by the CPU of the lobby server 13 executing the normal pennant creation program and friend pennant schedule notification program. The schedule deciding section 42 decides the schedule of the normal pennant and friend pennant so that each member of the league created by the league creating section 41 plays a game with all the other league members at least once. Also the schedule deciding section 42 decides the schedule of the normal pennant and friend pennant based on the desired start time requested by the members when the schedule of the normal pennant is decided.

The league canceling section 43 is implemented primarily by the CPU of the lobby server 13 executing the friend pennant cancellation program. When a member sends a password for cancellation which matches the password for cancellation stored in the canceling keyword storing section 48 using the client computer 2, the league canceling section 43 cancels the limited membership league created by the league creating section 41.

When a member who sends the password for cancellation using the client computer 2 selects to participate in a normal pennant, the league canceling section 43 cancels the limited membership league created by the league creating section 41, and the league creating section 41 creates a normal league of which this member and other arbitrarily selected members are the league members.

The outcome deciding section 44 is implemented primarily by the CPU of the lobby server 13 executing the outcome decision program. If one of the members who is supposed to participate in this game does not access the server system 1 using the client computer 2 when a predetermined amount of time elapse following the game start time specified by the game schedule, which is decided by the schedule deciding section 42, the outcome deciding section 44 decides that the member who has not accessed the game loses the game by default.

The keyword transmitting section 45 is implemented primarily by the CPU of the mail server 12 executing the friend pennant creation program. When one of the members, who is a sponsor, sends the electronic mail address of another member who the sponsor-user wants to have participate in the limited membership league along with a password, the keyword transmitting section 45 sends the password by electronic mail using the transmitted electronic mail address.

The game schedule notifying section 46 is implemented primarily by the CPU of the mail server 12 executing the normal pennant creation program and friend pennant schedule notification program. The game schedule notifying section 46 gives notification by electronic mail of the game schedule decided by the schedule deciding section 42 to each member of the normal league and the limited membership league created by the league creating section 41.

In the present embodiment, the lobby server 13 corresponds to the league creating means, schedule deciding means, league canceling means, and outcome deciding means, the game DB server 16 corresponds to the storing means, and the mail server 12 corresponds to the keyword transmitting means and game schedule notifying means.

The operation of the net game system configured as above will now be described. In the following description, it is assumed that the user has completed member registration with the member DB server 11, and that the member ID and password of the member have been stored in the external storage device of the client computer 2 used by the member, and are also stored in and being managed by the member DB server 11. Use of the net game requires a fee, and it is assumed by the accounting status that the member has already paid a predetermined fee, and has the right to play the net game.

When the member starts up the game progression program at the client side using the mouse of the input section 25 of the client computer 2, the mode select screen for the member to select a desired mode out of a plurality of modes is displayed on the display section 27.

Figure 3:
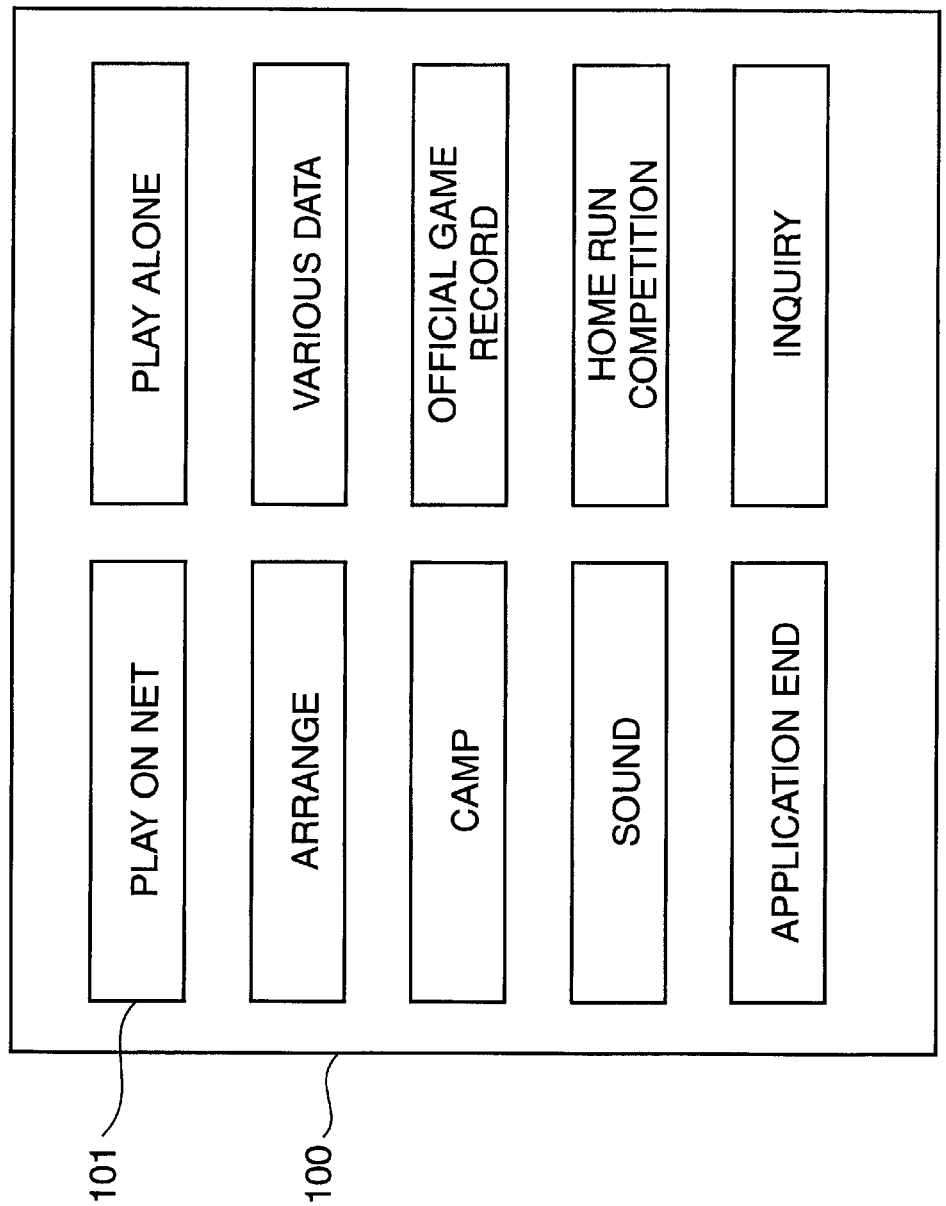
FIG. 3 is a diagram depicting an example of the mode select screen.

FIG. 3 is a diagram depicting an example of the mode select screen. For example, when the mode select screen 100 shown in FIG. 3 is displayed and the member selects the "Play on Net" button 101 using a mouse, the sub-menu screen for the member to select a pennant from a plurality of items in the sub-menu is displayed on the display section 27.

Figure 4:
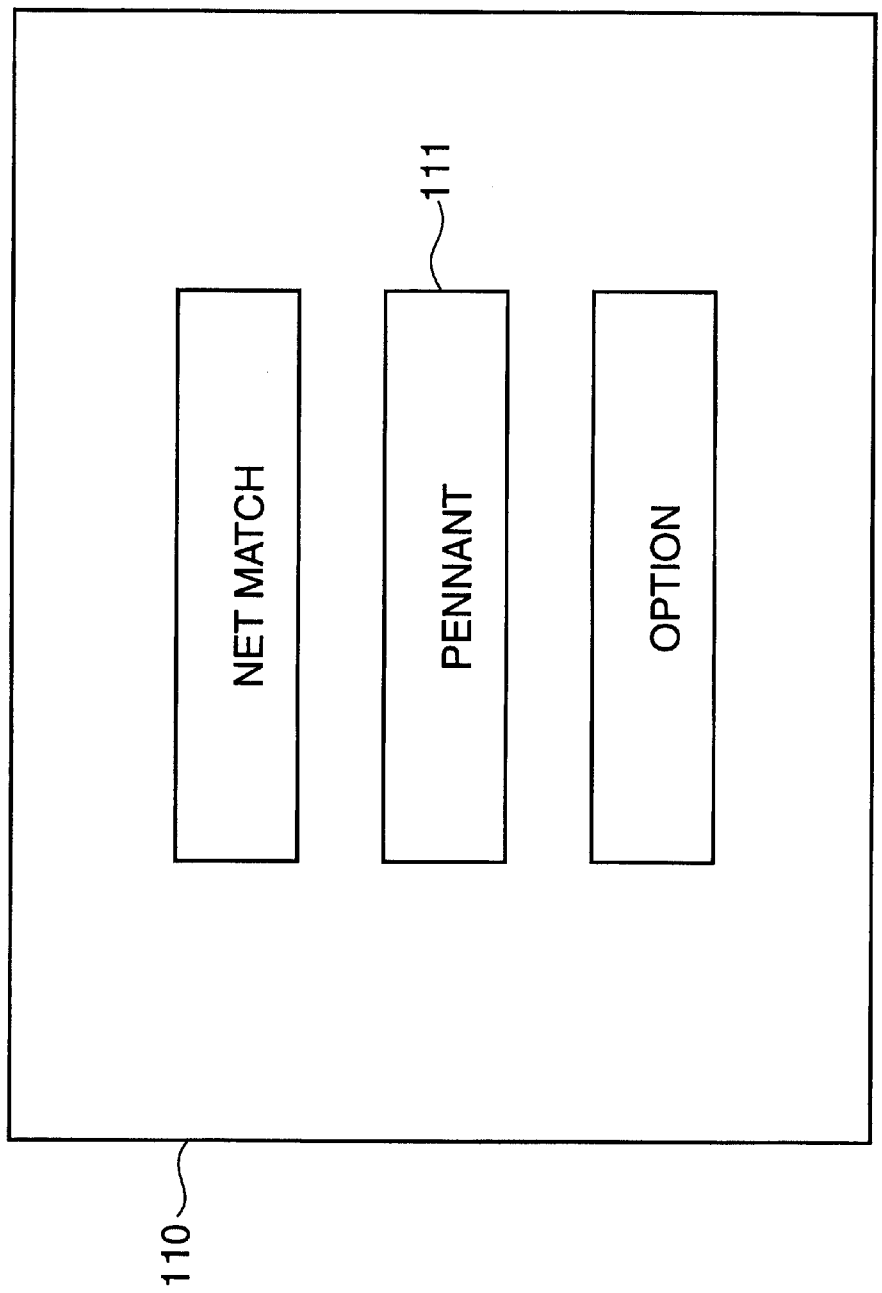
FIG. 4 is a diagram depicting an example of the sub-menu screen.

FIG. 4 is a diagram depicting an example of the sub-menu screen. For example, when the sub-menu screen 110 shown in FIG. 4 is displayed and the member selects the "Pennant" button 111 using the mouse, predetermined setup screens to perform various settings used for a baseball game are sequentially displayed.

When the various settings using the aforementioned setup screen are completed, the client computer 2 accesses the lobby server 13 via the network 3. When the net connection between the client computer 2 and the lobby server 13 is established, the client computer 2 sends the member ID and password stored in the external storage device 24 to the lobby server 13.

The lobby server 13 inquires of the member DB server 11 whether the member to whom the received member ID and password have been assigned has the right to play a game, and the member DB server 11 checks the accounting status of the member specified by the member ID and password, then gives notification to the lobby server 13 of the result as to whether this member has the right to play a game.

In this case, the member has the right to play a game, so the member DB server 11 notifies the lobby server 13 that the member has the right to play a game, and the lobby server 13 sends data to the client computer 2 to display the pennant lobby screen for the member to register in the pennant.

Figure 5:
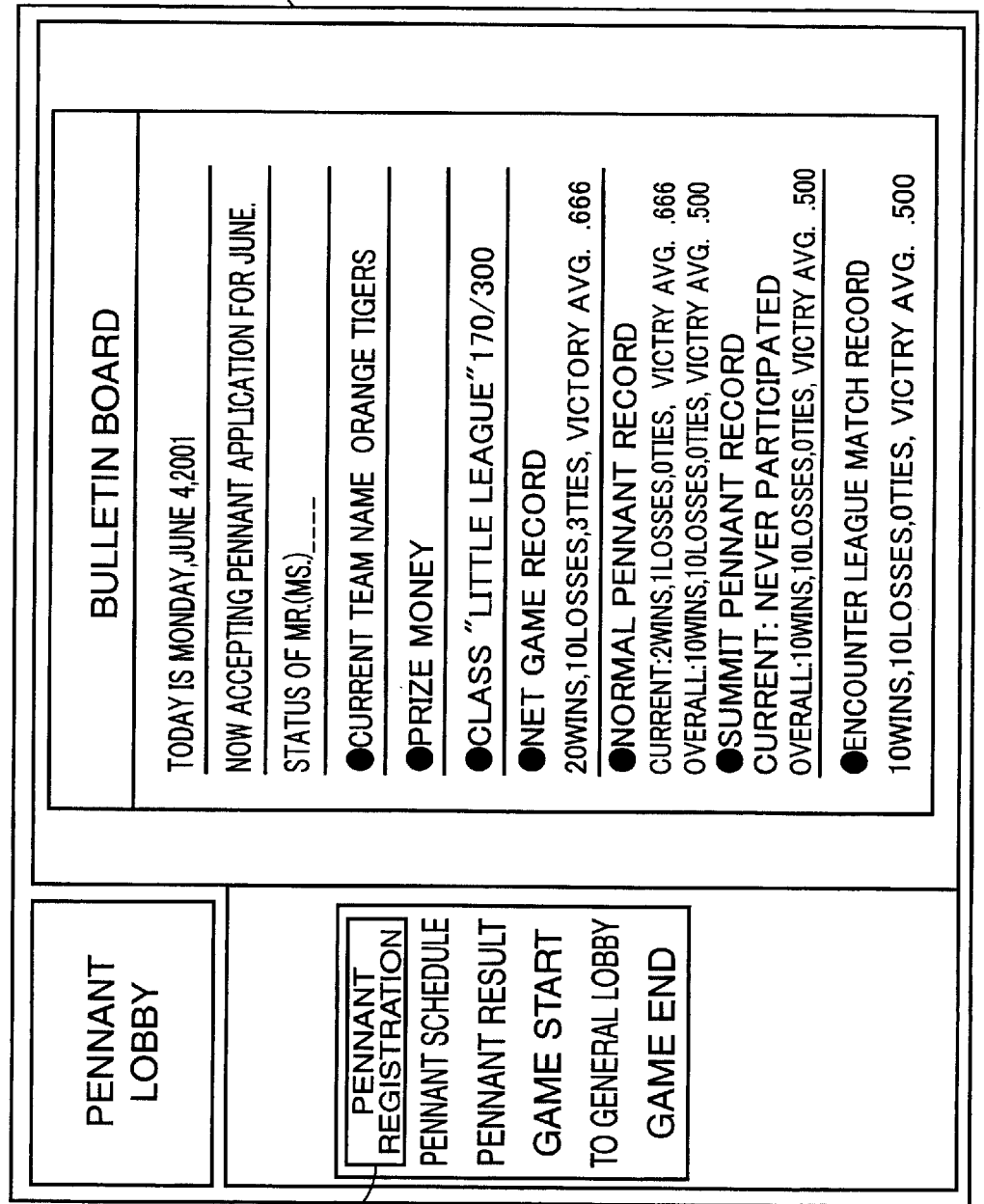
FIG. 5 is a diagram depicting an example of the pennant lobby screen.

FIG. 5 is a diagram depicting an example of the pennant lobby screen. The client computer 2 displays the pennant lobby screen 120 shown in FIG. 5 on the display section 27 using the received data. If the member selects the "Pennant Registration" button 121 at this time using the mouse, the client computer 2 starts up the browser program, and displays the member ID and password input screen on the display section 27 using the browser screen for the member to input the member ID and password.

Figure 6:
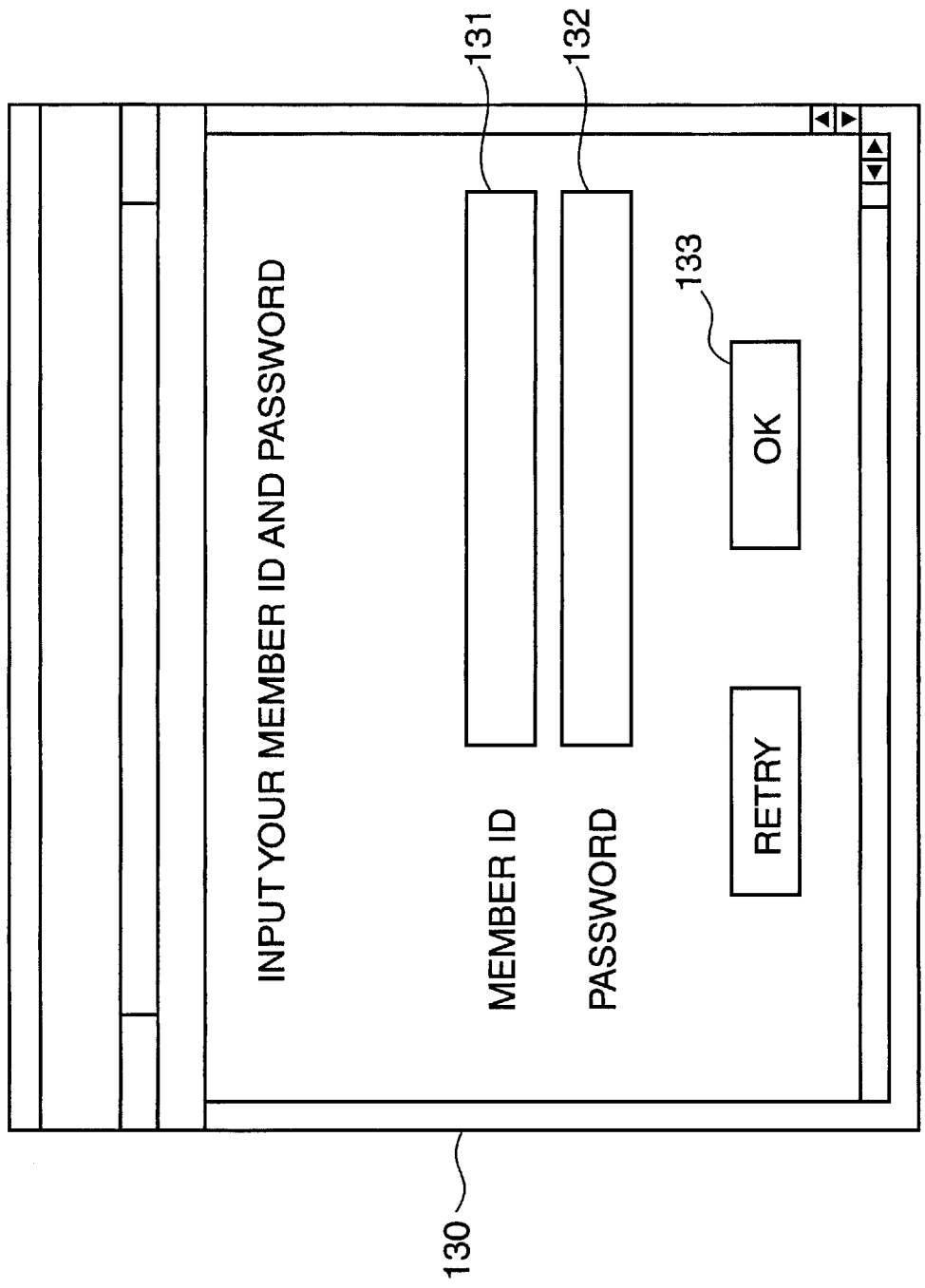
FIG. 6 is a diagram depicting an example of the member ID and password input screen.

FIG. 6 is a diagram depicting an example of the member ID and password input screen. For example, when the member ID and password input screen 130 shown in FIG. 6 are displayed, the member inputs the member ID and password in each input box 131 and 132 of the member ID and password input screen using the keyboard of the input section 25, and selects the "OK" button 133 using the mouse, the pennant select screen is displayed on the display section 27 for the member to select a normal pennant or friend pennant.

Figure 7:
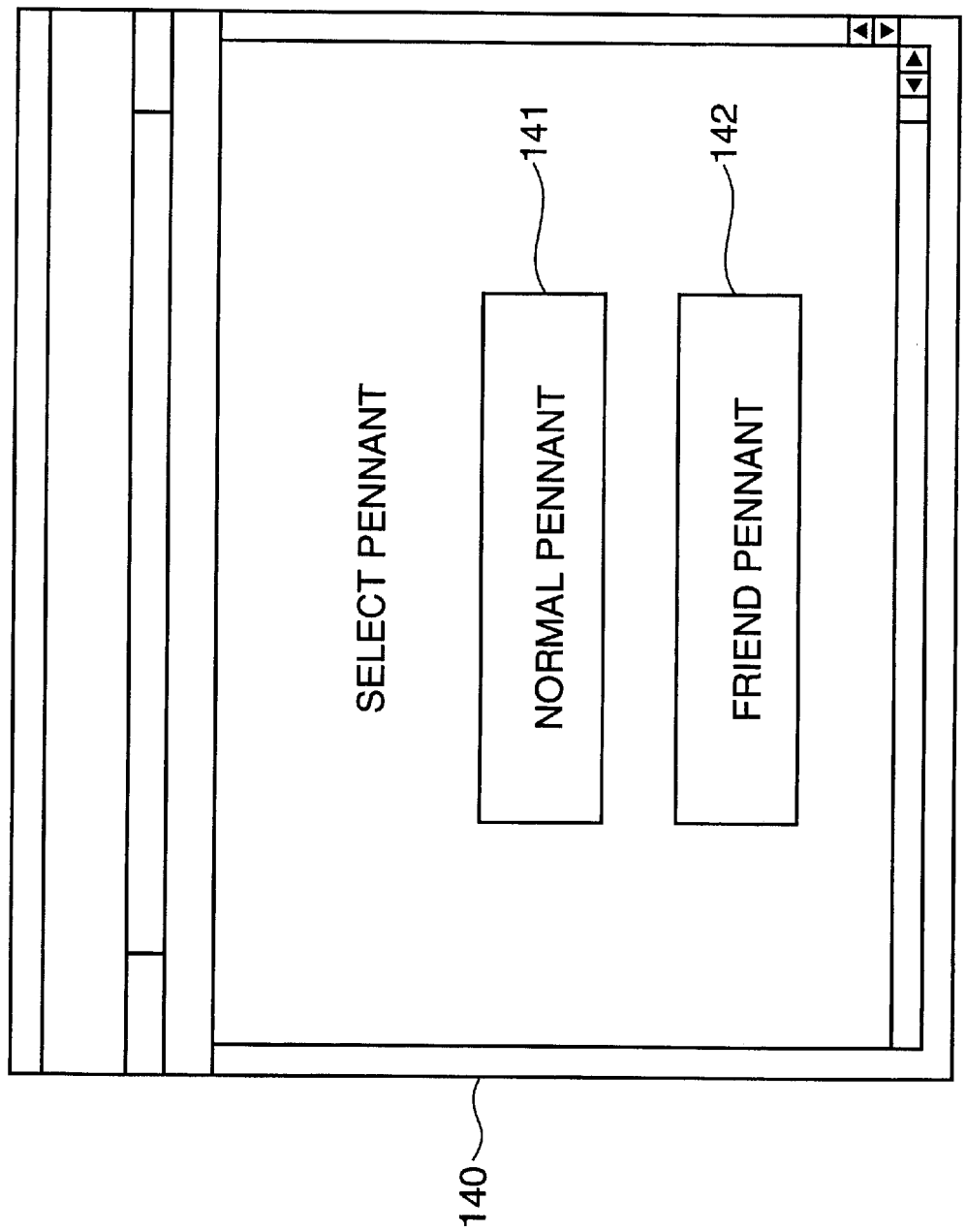
FIG. 7 is a diagram depicting an example of the pennant select screen.

FIG. 7 is a diagram depicting an example of the pennant select screen. For example, when the pennant select screen 140 shown in FIG. 7 is displayed and the member selects the "Normal Pennant" button 141 using the mouse, the normal pennant registration processing, which is described below, starts.

Figure 8:
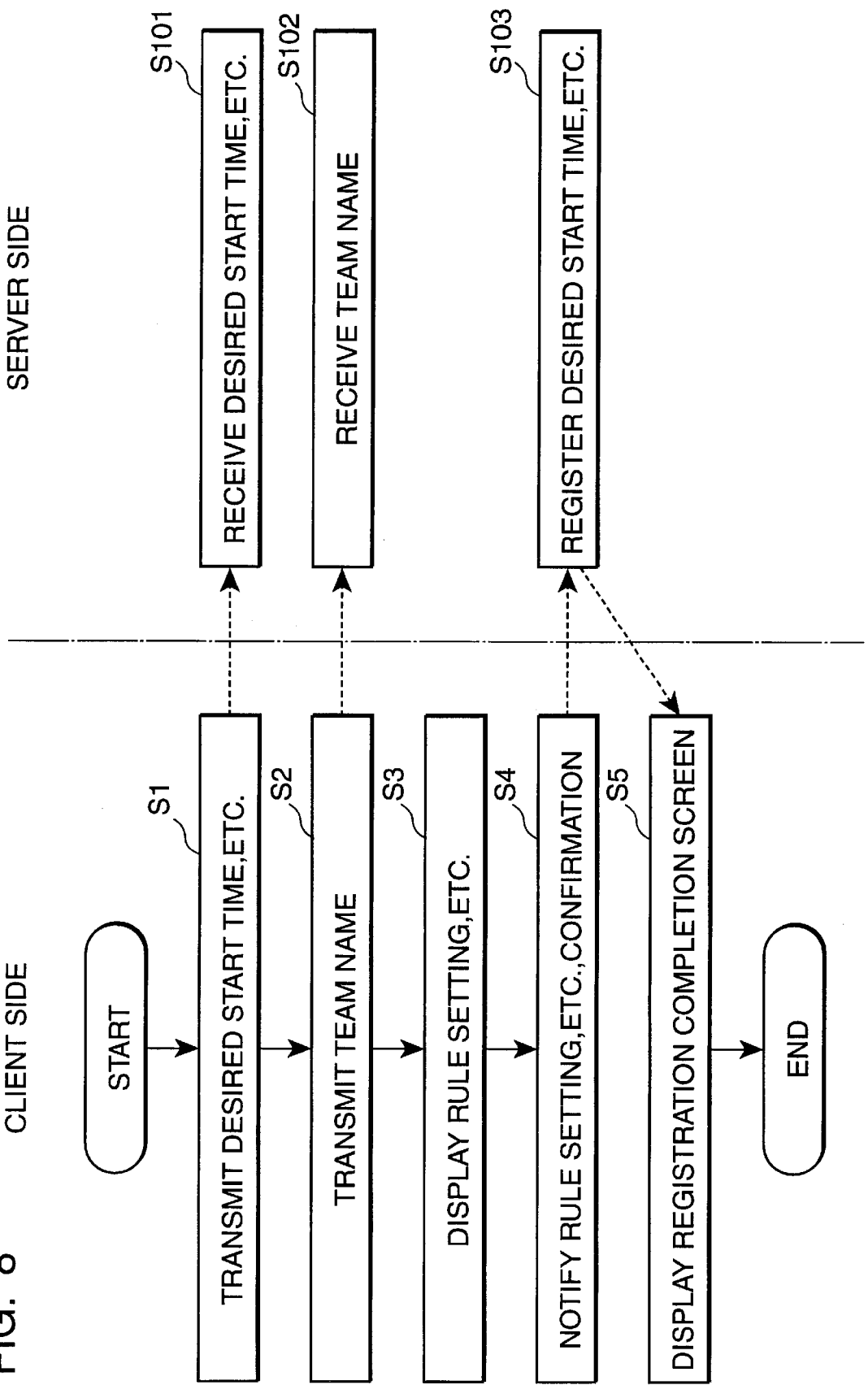
FIG. 8 is a flow chart depicting an example of normal pennant registration processing by the server system and client computer shown in FIG. 1.

FIG. 8 is a flow chart depicting an example of the normal pennant registration processing by the server system 1 and client computer 2 shown in FIG. 1. The normal pennant registration processing at the client computer 2 side is implemented by the CPU 22 executing the game progression program and browser program, and the normal pennant registration processing at the server system 1 side is implemented by the lobby server 13 executing the normal pennant registration program.

As FIG. 8 shows, in Step S1, the CPU 22 displays the desired start time and schedule notification destination mail address input screen of the normal pennant on the display section 27, receives the desired start time and schedule notification mail address of the normal pennant which the member inputs using the mouse and keyboard of the input section 25, and sends the desired start time of the normal pennant and the schedule notification destination mail address to the lobby server 13 using the communications section 26.

Figure 9:
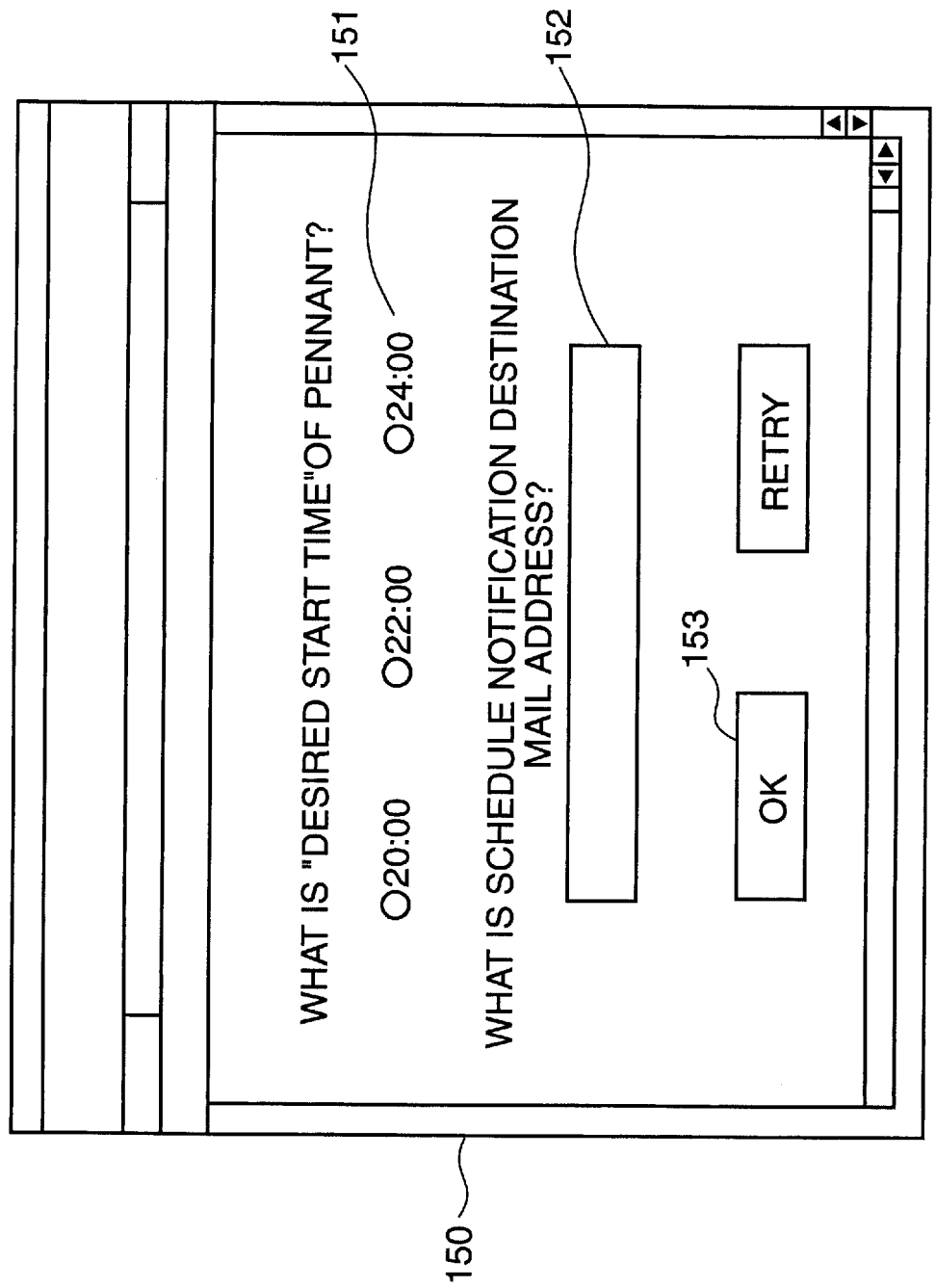
FIG. 9 is a diagram depicting an example of the desired start time and schedule notification destination mail address input screen of a normal pennant.

FIG. 9 is a diagram depicting an example of the desired start time and schedule notification destination mail address input screen of the normal pennant. For example, when the input screen 150 shown in FIG. 9 is displayed, and the member selects the desired time button from the desired start time select buttons (e.g. 20:00, 22:00, 24:00) of the normal pennant using the mouse, inputs his/her own electronic mail address in the input box 152 of the schedule notification destination mail address using the keyboard, and selects the "OK" button 153 using the mouse, the desired start time of the normal pennant and schedule notification destination mail address which were inputted are sent to the lobby server 13.

At this time, in Step S101, the lobby server 13 receives the transmitted desired start time of the normal pennant and schedule notification destination mail address, and stores the information in the RAM (not illustrated) in the lobby server 13.

Then in Step S2, the CPU 22 displays the team select screen on the display section 27, receives the team name selected by the member, and sends the team name to the lobby server 13 using the communications section 26.

Figure 10:
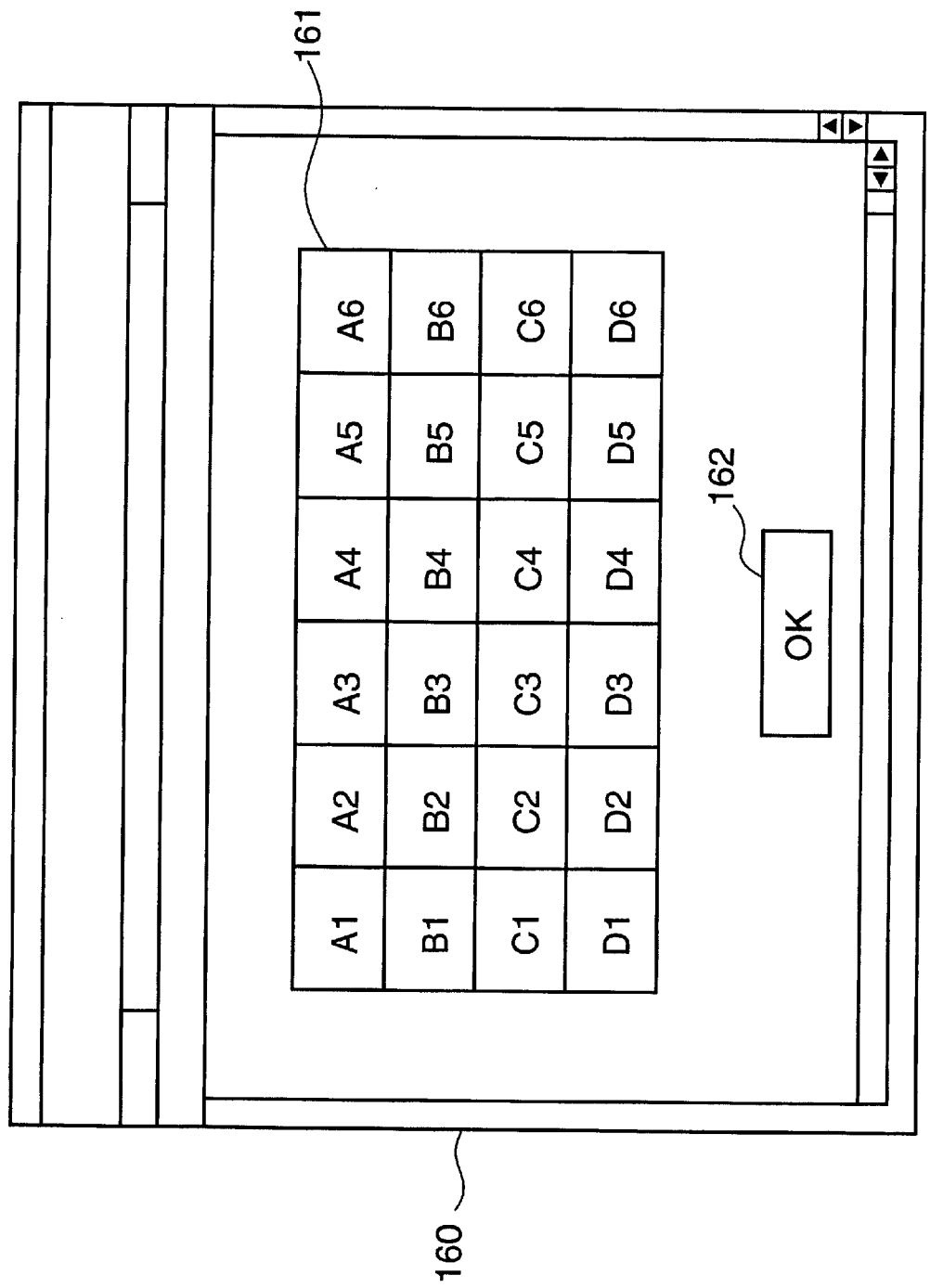
FIG. 10 is a diagram depicting an example of the team select screen.

FIG. 10 is a diagram depicting an example of the team select screen. For example, when the team select screen shown in FIG. 10 is displayed, and the member uses the mouse to select a team name to be used from the 12 baseball teams (A1–A6 and B1–B6 in FIG. 10 show baseball team names) of the A League and the B League out of the baseball team select box 161, and then selects the "OK" button 162, the selected team name is sent to the lobby server 13.

The teams which can be used for the pennant are not limited to the above example, and other existing teams or newly created teams may be registered for selection in the baseball team select box 161 C1–C6 and D1–D6.

At this time, in Step S102, the lobby server 13 receives the transmitted team name and stores it in RAM.

Next, in Step S3, the CPU 22 sequentially displays each confirmation screen, such as rule setting and game setting, to be used for the normal pennant, on the display section 27, and has the member confirm the displayed rule setting and game setting. Here, rule setting is, for example, the number of innings per game, whether extra innings are played in a game, whether a game can be called, and whether the DH system is used, whereas game setting is, for example, the wind status, weather status, game time zone, error occurrence status, player condition display status, and player injuries.

After the member confirms rule setting etc., the CPU 22 notifies the lobby server 13 that rule setting etc., has been confirmed in Step S4.

At this time, in Step S103, the lobby server 13 registers the stored desired start time of the normal pennant, schedule notification destination mail address, and team name in the game DB server 16, in association with the member ID and password of the member, as normal pennant registration information, and stores the current time as the registration time. Then, the lobby server 13 notifies the client computer 2 that the registration of the member to the normal pennant is complete.

Then, in Step S5, the CPU 22 displays a predetermined registration completion screen to indicate the acceptance of the registration of the member to the normal pennant on the display section 27, and normal pennant registration processing ends.

In the aforementioned normal pennant, the league consists of six members. Games are played regularly in the normal pennant, and, for example, a game starts at 20:00, 22:00 or 24:00 on a Monday, Wednesday, Friday and Saturday throughout about one month. The registration period of the normal pennant is limited to a predetermined period, such as 0:00 on the 15$^{th}$ of a month to 24:00 on the 5$^{th}$ of the next month. The game time of the normal pennant is limited to a predetermined time, and is set, for example, such that a new innings is not played if 90 minutes have elapsed.

As a rule, the outcome of the games of the normal pennant are determined by the outcome of the baseball game, but when a line is shut down and the connection of the server system 1 and the client computer 2 is disconnected, the lobby server 13 decides the outcome, regarding the member who disconnected the line first as the loser. The game result of the pennant decided in this way is announced at a predetermined time, and, for example, the result as of the 26$^{th}$ of each month is automatically updated on the next day, the 27$^{th}$, by the WWW server 15, and is posted to be read. The above is the same for a friend pennant, except that in this case one league may consist of three league members.

Figure 11:
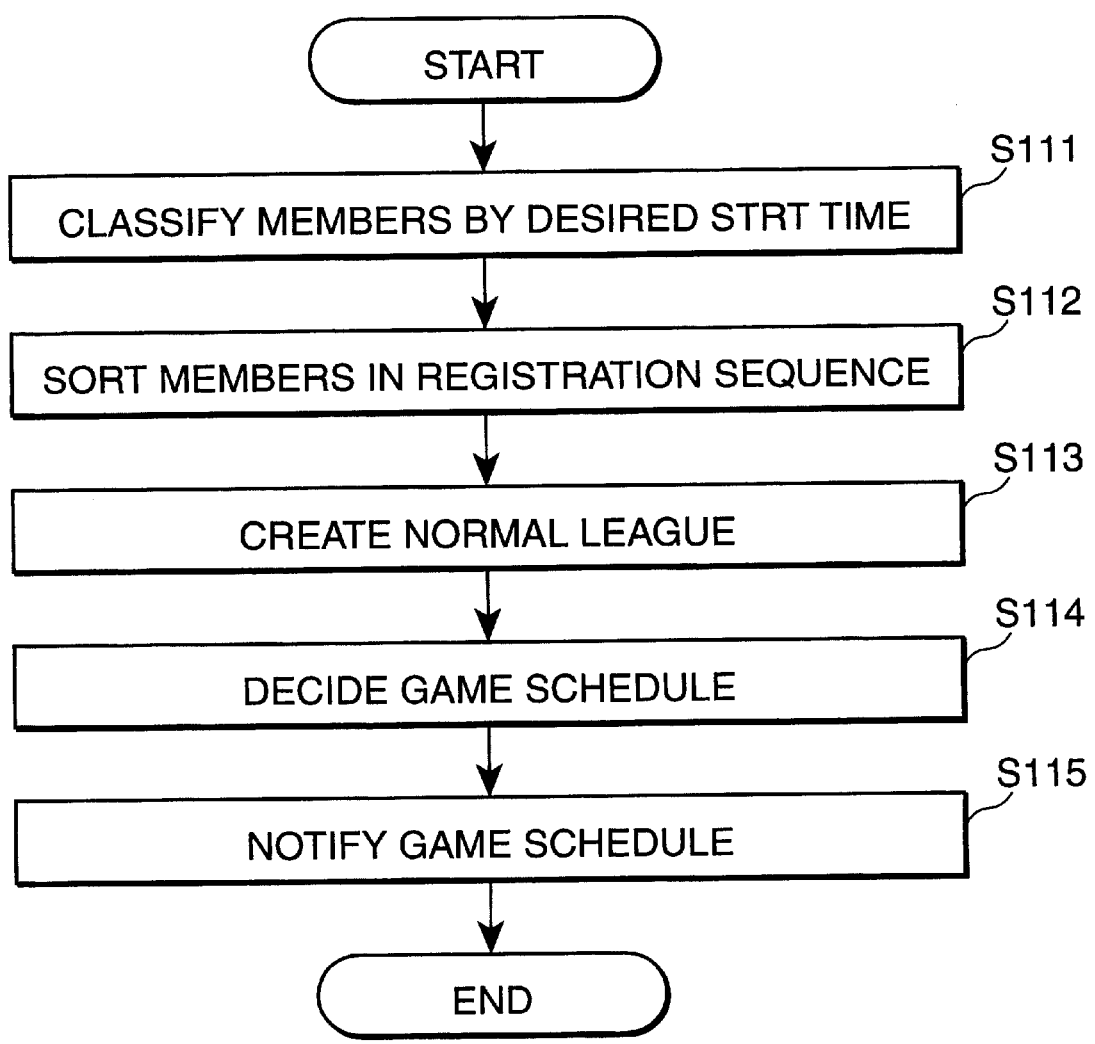
FIG. 11 is a flow chart depicting an example of normal pennant creation processing by the server system shown in FIG. 1.

After the registration period of the aforementioned normal pennant ends, the server system 1 performs normal pennant creation processing. FIG. 11 is a flow chart depicting an example of the normal pennant creation processing by the server system 1 shown in FIG. 1. The normal pennant creation processing shown in FIG. 11 is implemented primarily by the lobby server 13 executing the normal pennant creation program.

As FIG. 11 shows, in Step S111, the lobby server 13 first extracts the desired start time of the normal pennant from the normal pennant registration information for each member stored in the game DB server 16, and classifies each member by the desired start time. For example, members are classified into each time of 20:00, 22:00 and 24:00.

Then in Step S112, the lobby server 13 extracts the registration time of each member from the normal pennant registration information for each member stored in the game DB server 16, and sorts each member into registration sequence. In the present embodiment, it is permitted for a plurality of teams with the same name to exist in one league, and therefore the members are not classified by team name, but one league may consist of teams with different team names so that the members may be classified by team name.

Then in Step S113, the lobby server 13 extracts six members in registration sequence for each desired start time and sequentially creates a normal league, and instructs the game DB server 16 to store information on the created normal league. The game DB server 16 stores and manages the information on the created normal league.

Then in Step S114, the lobby server 13 decides the game schedule of each normal pennant so as to conform to the game schedule according to the desired start time, and instructs the game DB server 16 to store the decided game schedule. The game DB server 16 stores and manages the decided game schedule.

Finally in Step S115, the lobby server 13 reads the schedule notification destination mail address stored in the game DB server 16, and instructs the mail server 12 to inform each member to be a member of the normal league of the game schedule by electronic mail using the read schedule notification destination mail address via the member DB server 11. The mail server 12 sends the schedule of the normal pennant to each member by electronic mail using the schedule notification destination mail address.

In this way, according to the above embodiment, the members of each normal league are decided out of a plurality of members registered in the normal pennant using the client computer 2, a normal league which consists of designated members is sequentially created, and the game schedule of the created normal league is decided.

In this way, the normal leagues are sequentially created for a plurality of members who register for the normal pennant using the client computer 2, so many members can participate in one of the normal leagues. Since the schedule of the normal pennant is determined so that each league member can play games consecutively, each league member can play consecutive games according to the schedule of the normal pennant, and complicated strategies with variation can be used for a plurality of games played consecutively. Also, the opponents are not unspecified general opponents who differ for each game, but can be limited to members belonging to the same normal league, so a plurality of games can be played with opponents specified as members of the normal league.

As a result, heightened excitement can be provided to each member without diminishing the advantages of a net game in which many members can participate, and a sufficient sense of achievement can be provided to the winner of the normal pennant.

Since the schedule of the normal pennant is sent to each member by electronic mail, each member can know the schedule of the normal pennant in advance by reading the transmitted electronic mail by accessing the mail server such as a provider server using the client computer 2, and the possibility that each member of the normal pennant will participate in each game of the normal pennant according to the game schedule can be increased.

Since the game schedule is decided based on the desired start time requested by a member, a game can be played at a convenient time for the member, and the participation rate in baseball games as net games can be improved, and baseball games as net games can progress more smoothly.

The normal pennant creation processing is not limited to the aforementioned example, but can be modified in various ways, for example, only normal pennant registration may be accepted without accepting a desired start time from each member, so that the lobby server 13 freely creates a normal league from the members for whom registration has been received, and freely decides the game schedule of the created league.

The friend pennant will now be described in detail. When the pennant select screen 140 shown in FIG. 7 is displayed, and the member selects the "Friend Pennant" button 142 using the mouse, the friend pennant menu screen for the member to select a desired menu from a plurality of menus is displayed on the display section 27.

Figure 12:
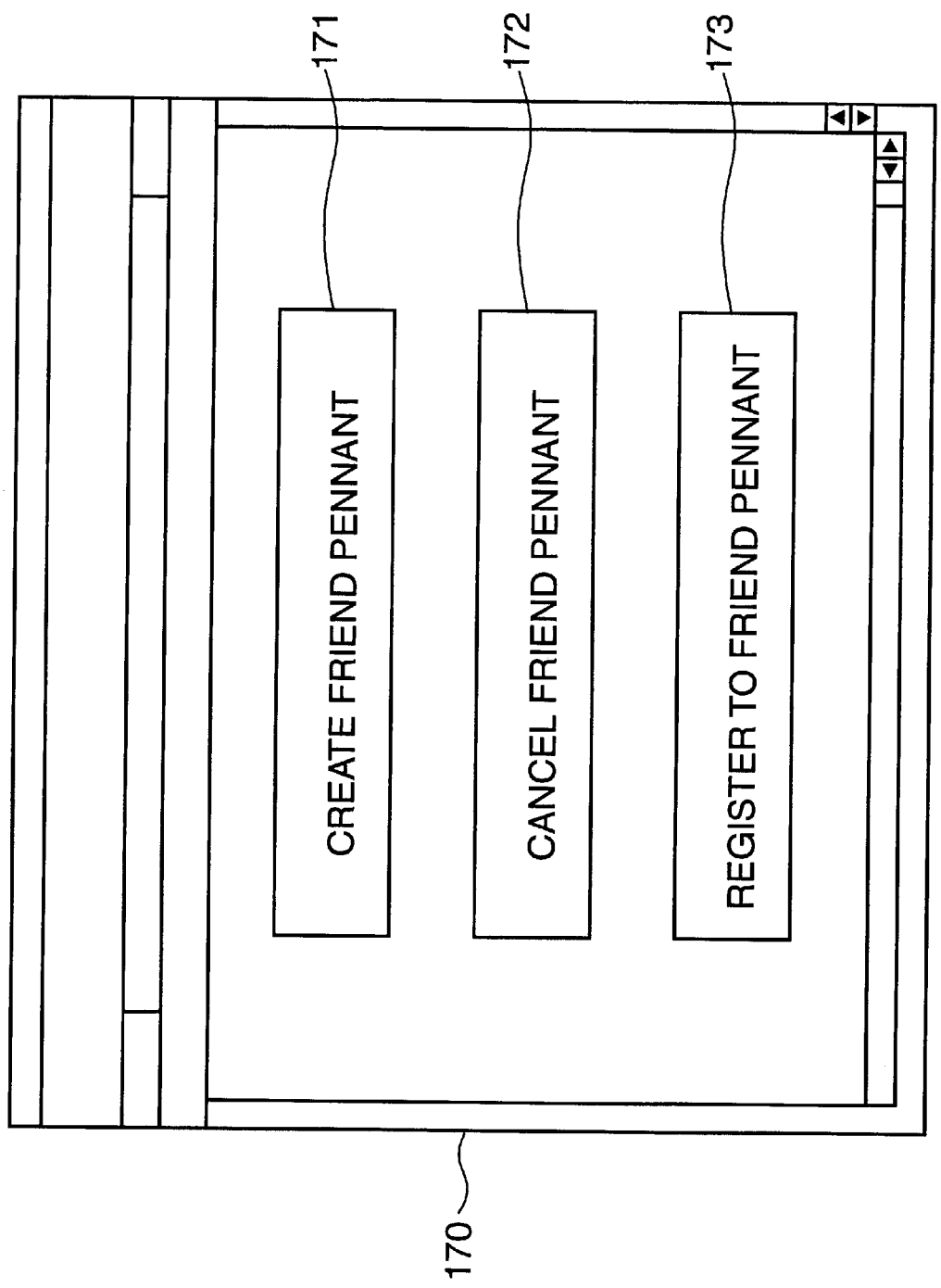
FIG. 12 is a diagram depicting an example of the friend pennant menu screen.

FIG. 12 is a diagram depicting an example of the friend pennant menu screen. For example, when the friend pennant menu screen 170 shown in FIG. 12 is displayed, and the member selects the "Create Friend Pennant" button 171 shown in FIG. 12 using the mouse, the following friend pennant creation processing starts.

Figure 13:
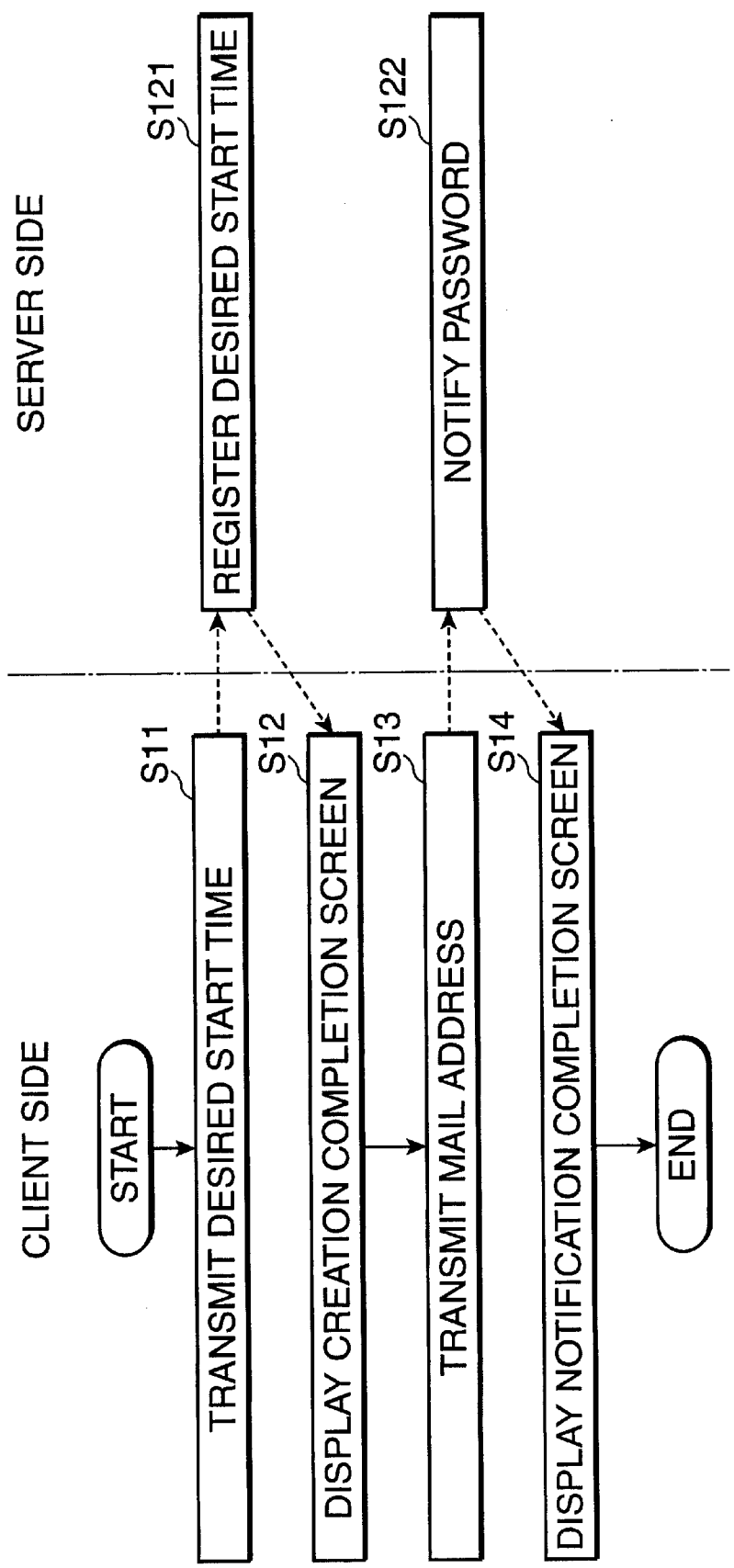
FIG. 13 is a flow chart depicting friend pennant creation processing by the server system and client computer shown in FIG. 1.

FIG. 13 is a flow chart depicting the friend pennant creation processing by the server system 1, and the client computer 2 shown in FIG. 1. The friend pennant creation processing at the client computer 2 side is implemented by the CPU 22 executing the game progression program and the browser program, and the friend pennant creation processing at the server system 1 side is implemented by the lobby server 13 executing the friend pennant creation program.

As FIG. 13 shows, in Step S11, the CPU 22 displays the input screen for the desired start time of the friend pennant, set number of members, member ID, schedule notification destination mail address, password, and password for cancellation on the display section 27, and accepts the desired start time of the friend pennant inputted by the member using the mouse and keyboard of the input section 25, and sends the desired start time of the friend pennant to the lobby server 13 using the communications section 26.

Figure 14:
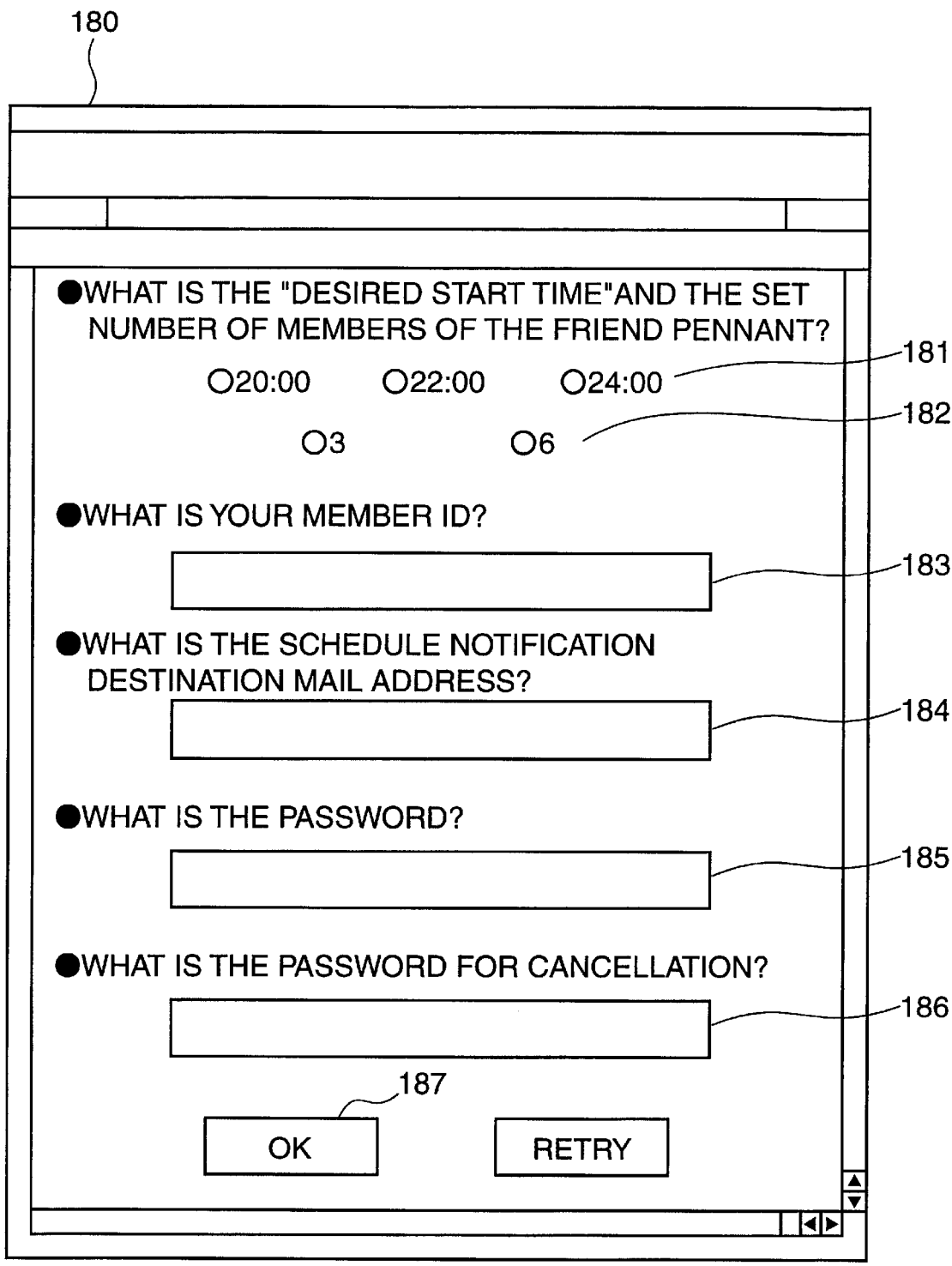
FIG. 14 is a diagram depicting an example of the input screen of the desired start time of the friend pennant, number of users to be set, member ID, schedule notification destination mail address, password, and password for cancellation.

FIG. 14 is a diagram depicting an example of the input screen for the desired start time of the friend pennant, set number of members, member ID, schedule notification destination mail address, password, and password for cancellation. For example, the input screen 180 shown in FIG. 14 is displayed, the member selects a button for the desired time from the select buttons of the desired start time (e.g. 20:00, 22:00, or 24:00) of the friend pennant using the mouse, selects a desired number of members (e.g. 3 or 6) of the friend pennant using the mouse, inputs the member ID of the member, electronic mail address, password, and password for cancellation respectively to the member ID input box 183, schedule notification destination mail address input box 184, password input box 185, and password for cancellation input box 186 respectively, and selects the "OK" button 187 using the mouse, whereby the desired start time, set number of members, member ID, electronic mail address, password, and password for cancellation which were inputted are sent to the lobby server 13.

Here in this embodiment, an arbitrary character string consisting of four alphabetic characters, for example, is used for the password and password for cancellation. The password and password for cancellation are not limited to the above example, and other character strings, including numeric characters and symbols, may be used, and the number of characters is also not limited to four, but may be another number of characters.

Then in Step S121, the lobby server 13 receives the transmitted desired start time, set number of members, member ID, electronic mail address, password and password for cancellation, and registers the desired start time, number of members, electronic mail address, password and password for cancellation, in the game DB server 16 in association with the member ID and password of the member as the friend pennant registration information to create the friend pennant. Then the lobby server 13 gives notification of the completion of the creation of the friend pennant to the client computer 2.

Then in Step S12, the CPU 22 displays a predetermined creation completion screen to indicate the creation completion of the friend pennant on the display section 27.

Then in Step S13, the CPU 22 displays the input screen for the self mail address and the mail address of the member to whom the password is notified on the display section 27, receives each mail address which a member inputs using the keyboard, and transmits each mail address to the lobby server 13 using the communications section 26.

Figure 15:
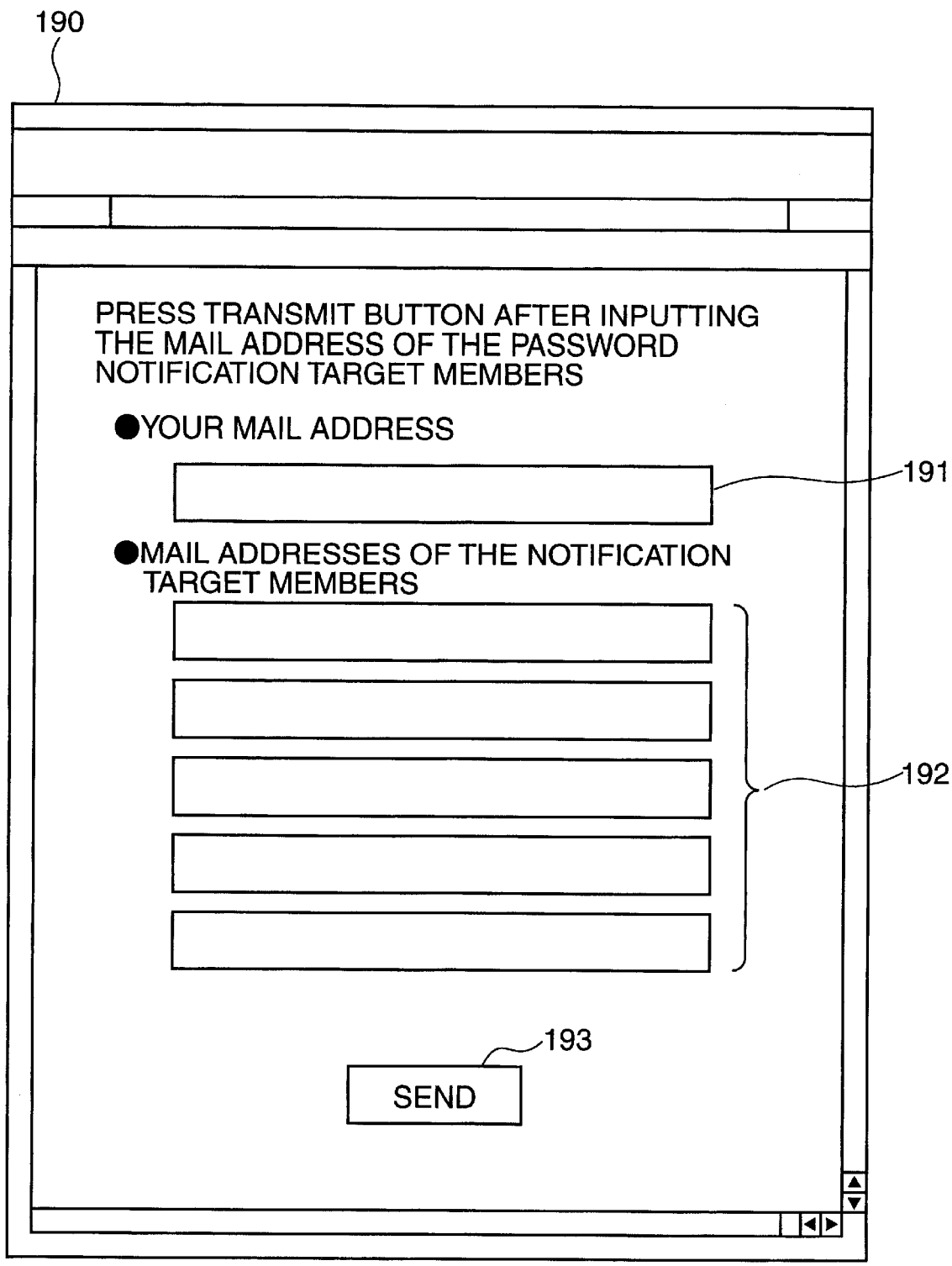
FIG. 15 is a diagram depicting an example of the input screen of the mail address of the user and mail address of a user to whom a password is notified.

FIG. 15 is a diagram depicting an example of the input screen of the mail address of a member to whom the self mail address and the password are notified. For example, when the input screen 190 shown in FIG. 15 is displayed, the member inputs the self mail address and the mail address of the notification target member in the input box 191 of the self mail address and the input box 192 of the mail address of the notification target member respectively using the keyboard, and selects the "Send" button 193 using the mouse 193, then the inputted self mail address and mail address of the notification target member are sent to the lobby server 13.

In FIG. 15, the input box 192 for inputting the mail address of the set number of members of the friend pennant, which is 5, is displayed, but if 3 is selected for the set number of members, the input box for inputting the mail address for 2 members may be displayed.

Then in Step S122, the lobby server 13 receives the mail address of the transmitted self mail address and notification target mail address, and instructs the mail server 12 to send an electronic mail in which the registered password is written to the mail address of the notification target member via the member DB server 11. The mail server 12 sends a password to each member whom the sponsor member desires to be a member of the limited membership league by electronic mail using the mail addresses of the notification target members. Then the lobby server 13 notifies the client computer 2 that the password of the friend pennant has been notified.

Then in Step S14, the CPU 22 displays the notification completion screen to indicate that the password of the friend pennant has been notified on the display section 27, and friend pennant creation processing ends.

When one of the members wishes to act as a sponsor and form a friend pennant using the aforementioned processing, the password registered by this member can automatically be sent to the acquaintances whom this member desires to be members of the limited membership league, so it is unnecessary to notify the password separately to the acquaintances, and the friend pennant can be created conveniently and easily.

The friend pennant registration processing by the server system 1 and client computer 2 shown in FIG. 1 will now be described. With reference to FIG. 12 again, the sponsor of the aforementioned friend pennant or the member who gave notification of the password, that is, the member who knows the password, selects the Register to "Friend Pennant" button 173, whereby friend pennant registration processing starts.

Figure 16:
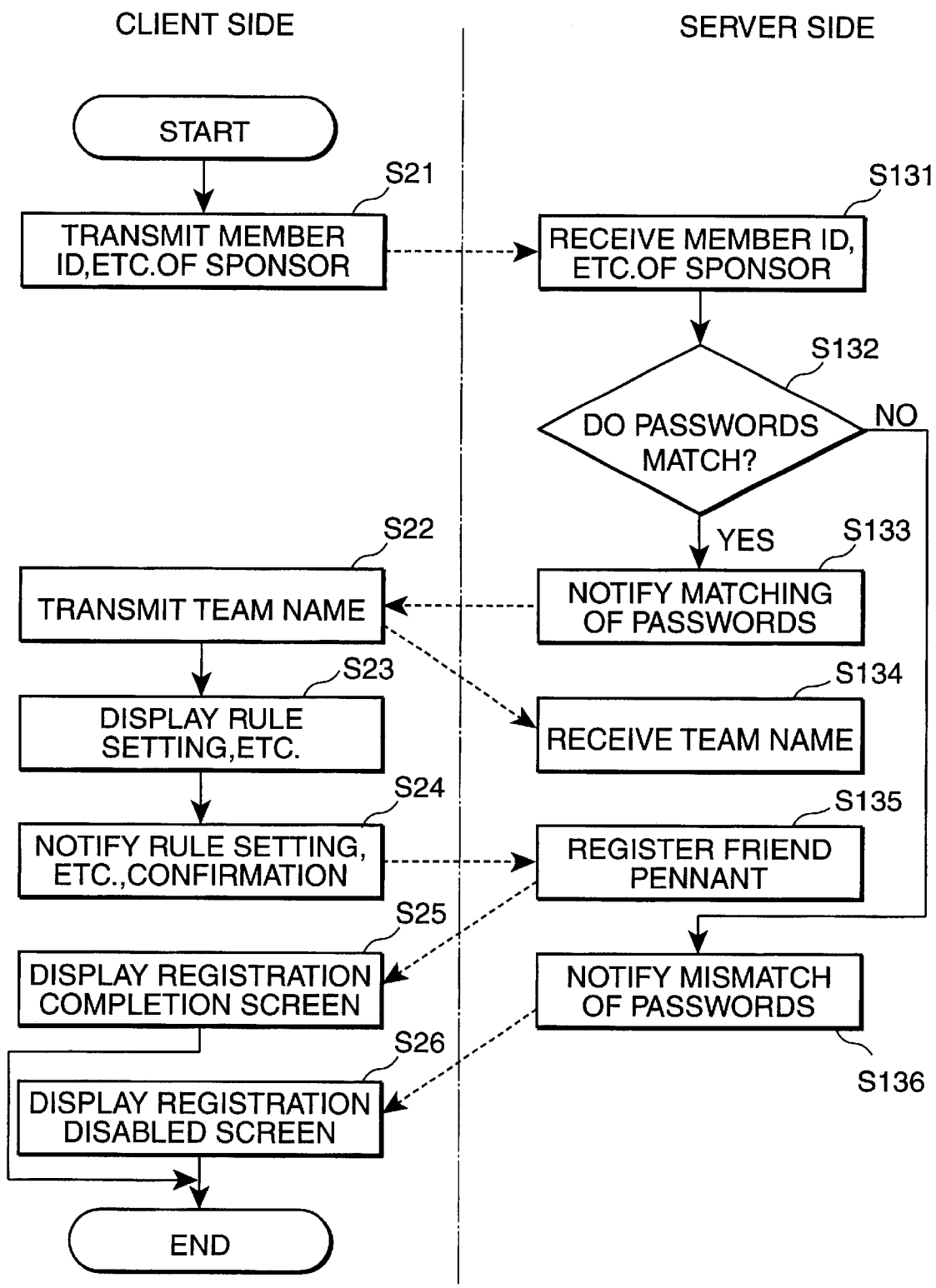
FIG. 16 is a flow chart depicting an example of friend pennant registration processing by the server system and client computer shown in FIG. 1.

FIG. 16 is a flow chart depicting an example of the friend pennant registration processing by the server system 1 and client computer 2 shown in FIG. 1. The friend pennant registration processing at the client computer 2 side is implemented by the CPU 22 executing the game progression program and browser program, and the friend pennant registration processing at the server system 1 side is implemented by the lobby server 13 executing the friend pennant registration program.

As FIG. 16 shows, first, in Step S21, the CPU 22 displays the input screen for the member ID of the sponsor, password, and schedule notification destination mail address, on the display section 27, accepts the member ID of the sponsor, password, and schedule notification destination mail address which are inputted by a member, and sends the member ID of the sponsor, password, and schedule notification destination mail address to the lobby server 13 using the communications section 26.

Figure 17:
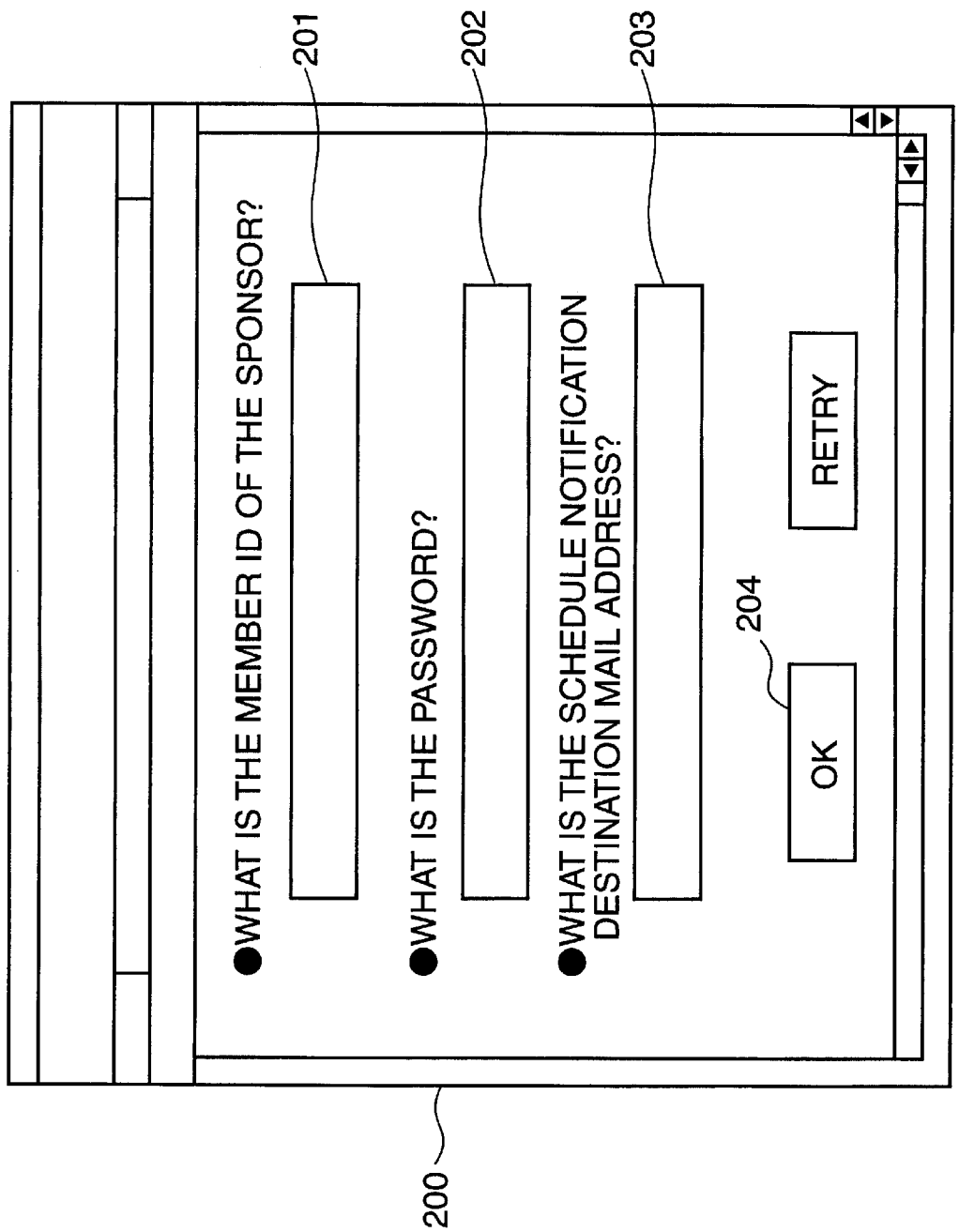
FIG. 17 is a diagram depicting an example of the input screen of the member ID of the sponsor, password, and schedule notification destination mail address.

FIG. 17 is a diagram depicting an example of the input screen for the member ID of the sponsor, password and schedule notification destination mail address. For example, the input screen 200 shown in FIG. 17 is displayed, a member inputs the member ID of the sponsor, password, and schedule notification destination mail address in the member ID of the sponsor input box 201, password input box 202, and schedule notification destination mail address input box 203 respectively, and selects the "OK" button 204 using the mouse, whereby the inputted member ID of the sponsor, password, and schedule notification destination mail address are sent to the lobby server 13.

At this time, in Step S131, the lobby server 13 receives the transmitted member ID of the sponsor, password, and schedule notification destination mail address, and stores this information in the RAM.

Then in Step S132, the lobby server 13 reads the password which was registered when the sponsor created the friend pennant using the transmitted member ID of the sponsor from the game DB server 16, and judges whether the read password matches the transmitted password. If the passwords match, the lobby server 13 notifies the client computer 2 that the passwords match in Step S133.

In this way, according to the present embodiment, a password is specified by the member ID when the passwords are judged to match, and a plurality of friend pennants with duplicate passwords can be created. If the member ID is not used as above, duplicate passwords are not allowed, so a message indicating that the same password exists may be displayed in Step S12 in FIG. 13, prompting the member to change the password to another character string.

When notification of the matching of passwords is received, the CPU 22 displays the team select screen on the display section 27, accepts the team name selected by the member, and sends the team name to the lobby server 13 using the communications section 26 in Step S22, as in Step S2 in FIG. 8.

At this time, in Step S134, the lobby server 13 receives the transmitted team name, and stores it in the RAM, as in Step S102 in FIG. 8.

Then in Step S23, the CPU 22 displays the rule setting and game setting to be used in the friend pennant on the display section 27, as in Step S3 shown in FIG. 8, and accepts the confirmation of the displayed rule setting and game setting by the member.

After the member confirms the rule setting etc., the CPU 22 notifies the lobby server 13 that the rule setting etc. is confirmed in Step S24, as in Step S4 in FIG. 8.

At this time, in Step S135, the lobby server 13 registers the stored schedule notification destination mail address and team name in the game DB server 16 in association with the member ID and the password of the member as friend pennant registration information, as in Step S103 shown in FIG. 8. Then the lobby server 13 notifies the client computer 2 that the registration of the member in the friend pennant is complete.

Then in Step S25, the CPU 22 displays a predetermined registration completion screen to indicate the acceptance of the member to the friend pennant on the display section 27, and the friend pennant registration processing ends.

On the other hand, if the passwords do not match (NO in Step S132), the lobby server 13 notifies the client computer 2 that the passwords do not match in Step S136.

When notification that the passwords do not match is received, the CPU 22 displays the registration disabled screen, which indicates that passwords do not match and that registration to the friend pennant cannot be accepted, on the display section 27 in Step S26, and the friend pennant registration processing ends.

In this way, according to the present embodiment, a friend pennant is created in which league baseball games are played by the limited membership league, wherein the password which a member registered using the client computer 2 is stored in the game DB server 16, and whereof only users who send the same password as the password stored in the game DB server 16 to the lobby server 13 using the client computer 2 become members.

To create the friend pennant in this way, each member of the limited membership league must know the password in advance, and the league members are limited to acquaintances who know each other before forming the limited membership league. Therefore acquaintances can create a limited membership league using a predetermined password, so acquaintances who wish to play a league baseball game can play in the friend pennant, further improving the excitement of baseball games played as net games.

Also the net game has a characteristic in that each member can participate voluntarily, and therefore a case can be envisioned in which an opponent does not access on the date and time when a league match is played so that the league baseball game cannot be played. However in the case of the aforementioned friend pennant, the members know each other, so the incentive to participate in the friend pennant can be increased, and league matches played as a net game can proceed smoothly.

Figure 18:
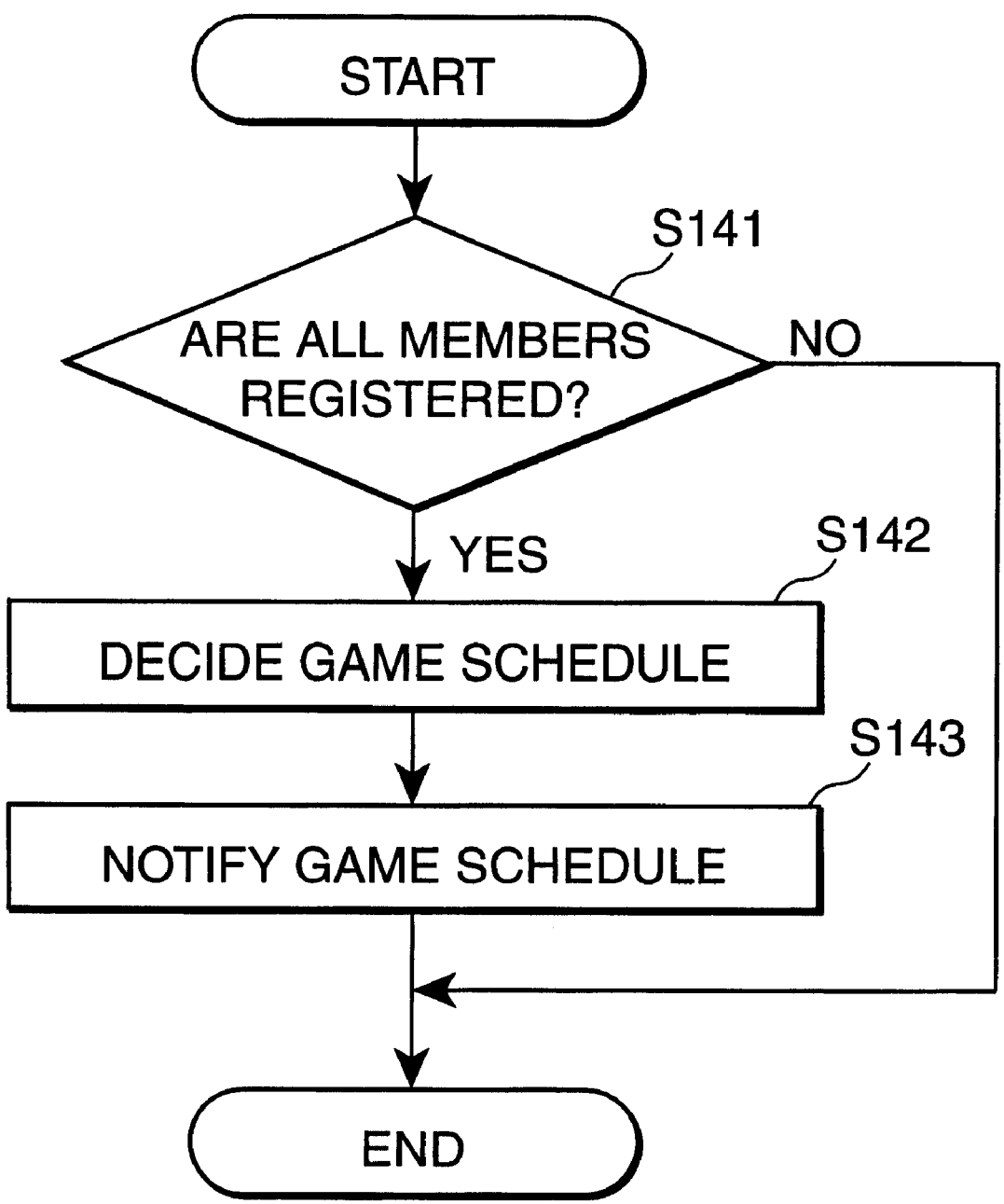
FIG. 18 is a flow chart depicting an example of friend pennant schedule notification processing by the server system shown in FIG. 1.

When the friend pennant registration period ends, the server system 1 executes friend pennant schedule notification processing. FIG. 18 is a flow chart depicting an example of the friend pennant schedule notification processing by the server system 1 shown in FIG. 1. The friend pennant schedule notification processing shown in FIG. 18 is primarily implemented by the lobby server 13 executing the friend pennant schedule notification program.

As FIG. 18 shows, in Step S141, the lobby server 13 judges whether all the league members have registered in the friend pennant by the aforementioned friend pennant registration processing, and if all the league members have registered in the friend pennant, processing moves to Step S142, but if at least one league member has not registered in the friend pennant, processing ends since the friend pennant cannot be held.

If all the league members have registered to the friend pennant, the lobby server 13 decides the game schedule of each friend pennant to conform to the game schedule according to the desired start time in Step S142.

Finally in Step S143, the lobby server 13 reads the schedule notification destination mail address stored in the game DB server 16, and instructs the mail server 12 via the member DB server 11 to inform each member to be a league member of the limited membership league of the game schedule by electronic mail using the read schedule notification destination mail address. The mail server 12 sends the schedule of the friend pennant to each member by electronic mail using the schedule notification destination mail address.

By the above processing, the schedule of the friend pennant is transmitted to each member registered in the friend pennant by electronic mail, so each member can know the schedule of the friend pennant in advance by accessing the mail server, such as a provider server, using the client computer 2, and reading the transmitted electronic mail, which increases the probability that each member will participate in each game of the friend pennant according to the game schedule.

The friend pennant cancellation processing by the server system 1 and the client computer 2 shown in FIG. 1 will now be described. With reference to FIG. 12 again, the sponsor of the aforementioned friend pennant selects the "Cancel Friend Pennant" button 172 using the mouse, whereby the friend pennant cancellation processing starts.

Figure 19:
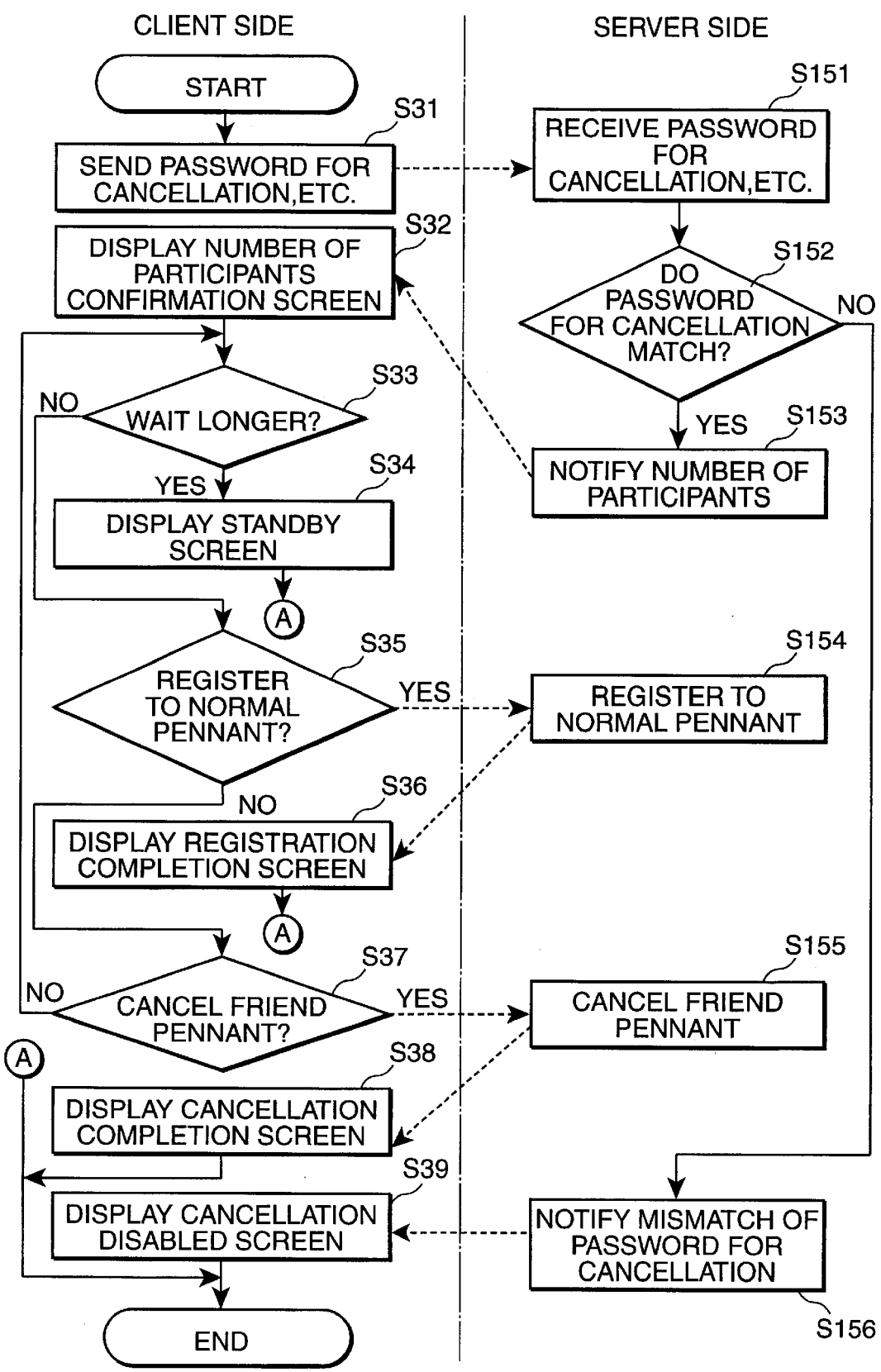
FIG. 19 is a flow chart depicting an example of friend pennant cancellation processing by the server system and client computer shown in FIG. 1.

FIG. 19 is a flow chart depicting an example of the friend pennant cancellation processing by the server system 1 and client computer 2 shown in FIG. 1. The friend pennant cancellation processing at the client computer 2 side shown in FIG. 19 is implemented by the CPU 22 executing the game progression program and browser program, and the friend pennant cancellation processing at the server system 1 side is implemented by the lobby server 13 executing the friend pennant cancellation program.

As FIG. 19 shows, in Step S31, the CPU 22 displays the input screen for the password and password for cancellation on the display section 27, accepts the password and password for cancellation which a member inputs, and sends the password and password for cancellation to the lobby server 13 using the communications section 26.

Figure 20:
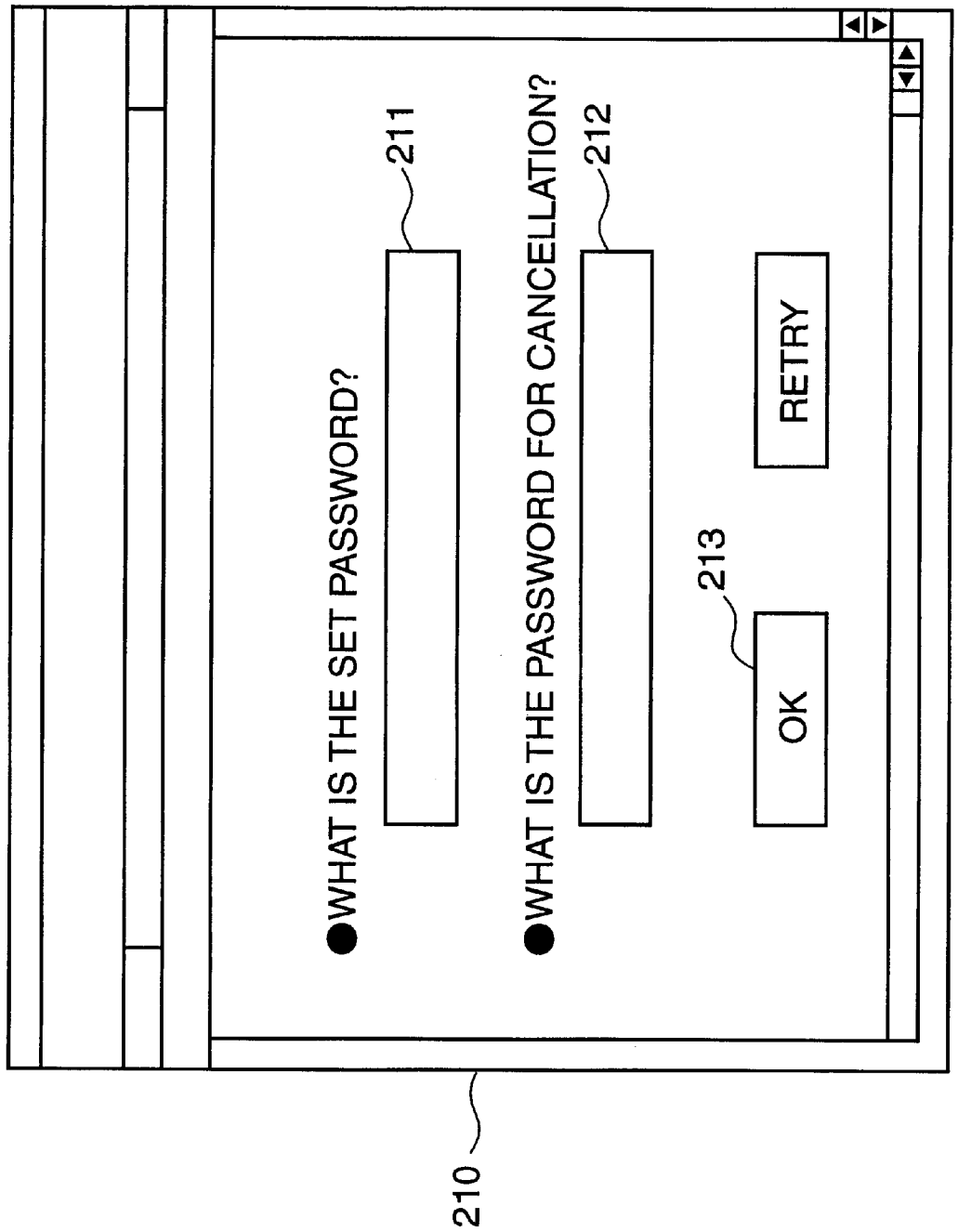
FIG. 20 is a diagram depicting an example of the input screen of the password and password for cancellation.

FIG. 20 is a diagram depicting an example of the input screen for the password and password for cancellation. For example, when the input screen 210 shown in FIG. 20 is displayed, and the member who is the sponsor of the friend pennant inputs the password and password for cancellation in the password input box 211 and password for cancellation input box 212 respectively using the keyboard of the input section 25, and selects the "OK" button 213 using the mouse, the inputted password and password for cancellation are sent to the lobby server 13.

At this time, in Step S151, the lobby server 13 receives the transmitted password and password for cancellation, and stores them in the RAM.

Then in Step S152, the lobby server 13 reads the password for cancellation, which was set when the friend pennant was created, from the game DB server 16, and judges whether the read password for cancellation and the transmitted password for cancellation match. If the passwords for cancellation match, the lobby server 13 notifies the client computer 2 of the number of participants who already registered in the friend pennant for which the matched passwords for cancellation are set.

In step S32, when notification of the number of participants is received, the CPU 22 displays the number of participants confirmation screen on the display section 27 using the number of the participants of the friend pennant sent from the lobby server 13.

Figure 21:
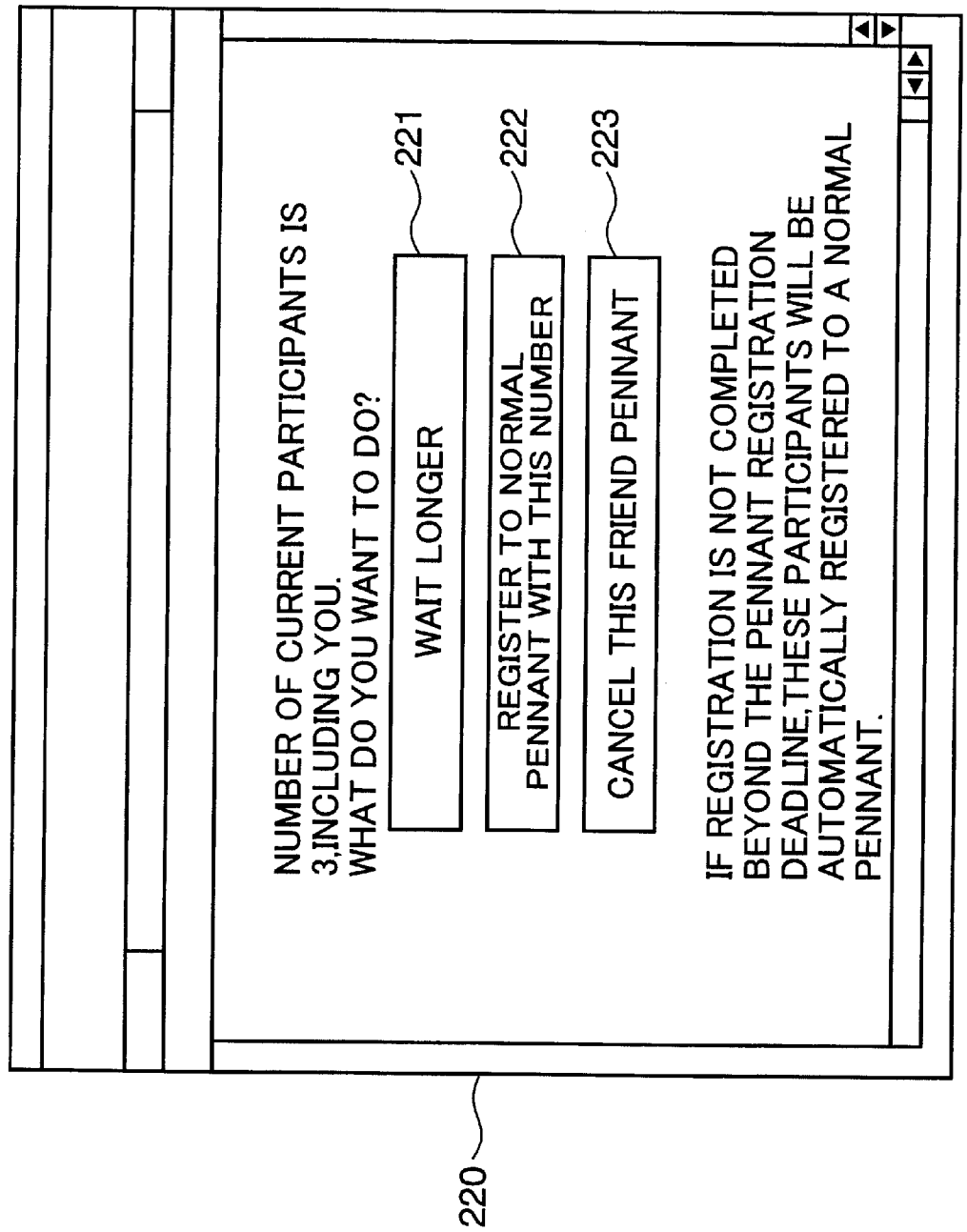
FIG. 21 is a diagram depicting an example of the number of participants confirmation screen.

FIG. 21 is a diagram depicting an example of the number of participants confirmation screen. For example, when the friend pennant consists of 6 members and only 3 members have registered at that time, the number of participants confirmation screen 220 shown in FIG. 21 is displayed. At this time, a member can check the current number of participants and select one of "Wait Longer" button 221, "Register to Normal Pennant With This Number" button 222, and "Cancel This Friend Pennant" button 223.

Then in Step S33, the CPU 22 judges whether the member has selected the "Wait Longer" button 221 using the mouse. If the "Wait Longer" button 221 is selected, the CPU 22 displays a standby screen displaying "Wait Longer" on the display section 27 in Step S34, and ends processing. If the "Wait Longer" button 221 is not selected, processing moves to Step S35.

In Step S35, if the "Wait Longer" button 221 is not selected, the CPU 22 judges whether the member selected "Register to Normal Pennant With This Number" button 222 using the mouse. If the "Register to Normal Pennant With This Number" button 222 is selected, the CPU 22 notifies the lobby server 13 to register all the members currently registered in the normal pennant using the communications section 26, and if the "Register to Normal Pennant With This Number" button 222 is not selected, processing moves to Step S37.

When notification is received for all the members who are currently registered in the friend pennant to register in the normal pennant, the lobby server 13 instructs the game DB server 16 to register all the members who are currently registered in the friend pennant, for which passwords for cancellation match, in the normal pennant in Step S154. The game DB server 16 registers all the members registered in the specified friend pennant in the normal pennant, and cancels the friend pennant. Then the lobby server 13 notifies the client computer 2 that registration to the normal pennant is complete.

Then in Step S36, the CPU 22 displays a predetermined registration completion screen to indicate the acceptance of registration to the normal pennant on the display section 27, and ends processing.

When the member who sends the password for cancellation selects to participate in the normal pennant by the aforementioned processing, the created friend pennant is cancelled, and all the members registered to the friend pennant are registered to the normal pennant, and finally a normal pennant, in which each member can participate, is created.

In this way, when members attempt to form a friend pennant but cannot due to such a reason as some acquaintances not registering to the friend pennant, the members can automatically participate in the normal pennant, so the choice of pennants to participate in can be expanded, and members can easily participate in the normal pennant. In the above description, all the members registered to the friend pennant are registered to the normal pennant, but an embodiment in which only the members who send the password for cancellation are registered to the normal pennant is also possible.

When the "Register to Normal Pennant With This Number of People" button 222 is not selected (NO in Step S35), the CPU 22 judges whether the member has selected the "Cancel This Friend Pennant" button 223 using the mouse in Step S37. If the "Cancel This Friend Pennant" button 223 is selected, the CPU 22 instructs the lobby server 13 to cancel the friend pennant using the communications section 26, whereas if the "Cancel This Friend Pennant" button 223 is not selected, processing moves to Step S33, and subsequent processings are continued.

When the notice to cancel the friend pennant is received in Step S155, the lobby server 13 instructs the game DB server 16 to cancel the friend pennant for which the password for cancellation matches. The game DB server 16 cancels the instructed friend pennant. Then the lobby server 13 notifies the client computer 2 that cancellation of the friend pennant is complete.

Then in Step S38, the CPU 22 displays a predetermined cancellation completion screen to indicate the cancellation of the friend pennant on the display section 27, and processing ends.

If the passwords for cancellation do not match (NO in Step S152), the lobby server 13 notifies the client computer 2 that the passwords for cancellation do not match in Step S156.

Then in Step S39, the CPU 22 displays a predetermined cancellation disabled screen to indicate that the passwords for cancellation do not match, and hence cancellation of the friend pennant cannot be accepted on the display section 27, and the processing ends.

As described above, when a member sends a password for cancellation which is the same as the password for cancellation stored in the game DB server 16 using the client computer 2, the friend pennant created by this member is cancelled.

In this way, to cancel the friend pennant, the password for cancellation must be known in advance, and the right of cancellation must only be assigned to a member who knows the password for cancellation, so the security of the friend pennant can be assured. Furthermore, once created, a friend pennant can be cancelled in accordance with a request from a member, so the choice of the members when participating in baseball games played as net games can be expanded, and the advantage of a net game where members can participate voluntarily is not diminished.

As described above, games are played according to the schedule of each league after the normal pennant or friend pennant is created, but net games have a characteristic in which members can participate voluntarily, so it is foreseeable that a member may not participate, and hence handling in such a case is important.

Figure 22:
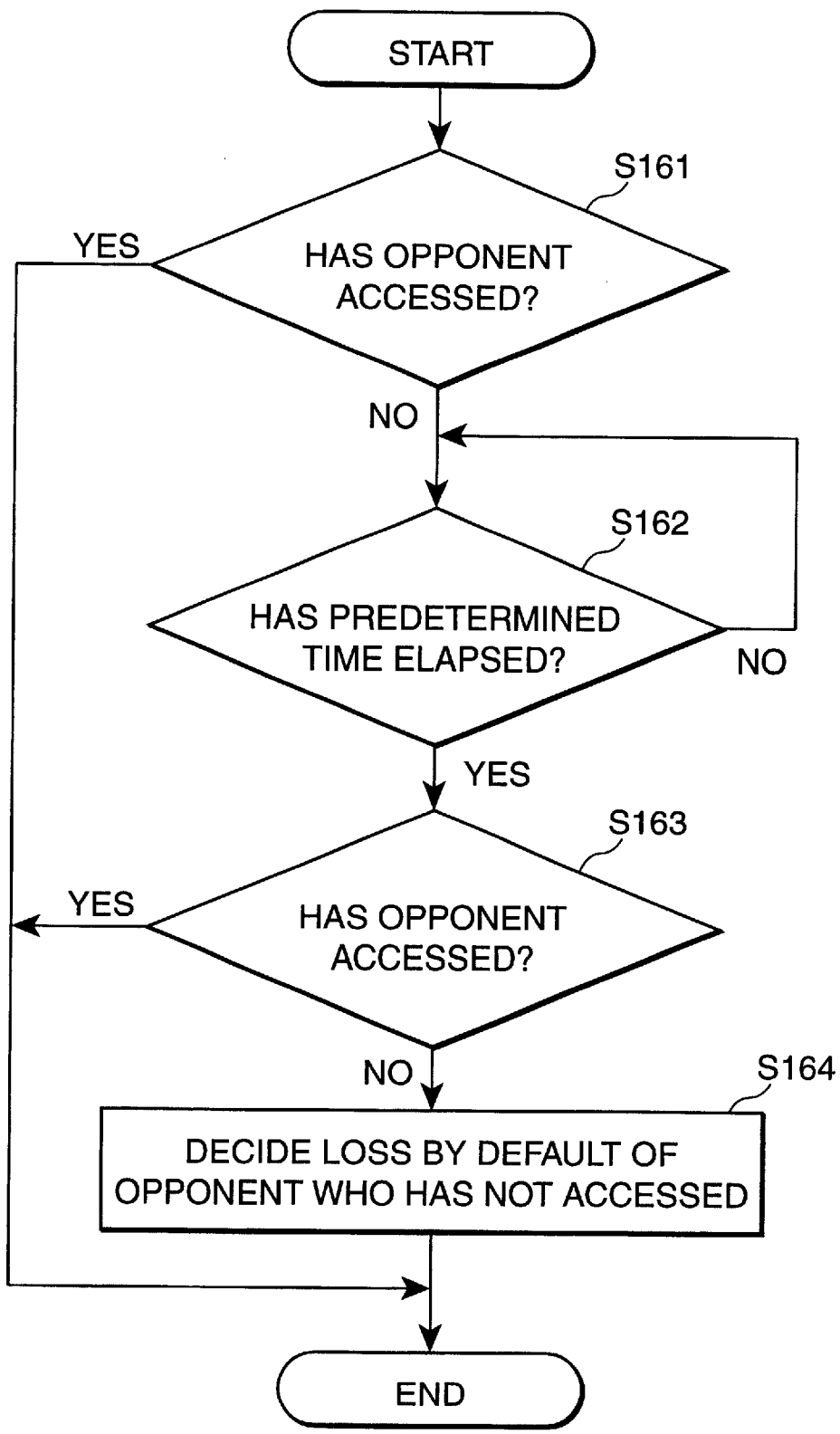
FIG. 22 is a flow chart depicting an example of game outcome decision processing by the server system shown in FIG. 1.

Therefore, according to the present embodiment, a case when a member does not participate in a game is handled using the outcome decision processing described below. FIG. 22 is a flow chart depicting an example of the outcome decision processing by the server system 1 shown in FIG. 1. The outcome decision processing shown in FIG. 22 is primarily implemented by the lobby server 13 executing the outcome decision program.

As FIG. 22 shows, in Step S161, the lobby server 13 judges whether the member to be the opponent has accessed using the client computer 2 at the game start time of each pennant.

When both opponents have accessed and the game can be started (YES in Step S161), the processing ends and the normal game progression processing for expediting the baseball game is continued. On the other hand, when one of the opponents has not accessed, processing moves to Step S162.

Then in Step S162, the lobby server 13 judges whether a predetermined amount of time has elapsed since the game start time, and if the predetermined amount of time has not elapsed, Step S162 is repeated, and processing moves to Step S163 if a predetermined amount of time has elapsed.

Then in Step S163, the lobby server 13 judges again if the member to be the opponent has accessed using the client computer 2. If both opponents have accessed and the game can be started (YES in Step S163), processing ends, and the normal game progression processing for expediting the baseball game is continued. On the other hand, if one of the opponents has not accessed, processing moves to Step S164. In this case, a predetermined penalty may be assigned to the member who is late for the game start time, depending on the length of delay, and for example, the capabilities of the characters (baseball players) whom this member uses for the baseball game may be reduced.

When only one of the opponents has not accessed, the lobby server 13 decides that the member who does not access the game loses the game by default in Step S164, and decides that the member who accesses the game wins the game by default, and notifies this result to the game DB server 16. The game DB server 16 stores and manages this result as a game result of this pennant. A description of a case in which neither opponent accesses the game is omitted here, but in this case the game may be played again or may end in a tie.

By the aforementioned processing, when one of the members who is supposed to participate in the game does not access the server system 1 using the client computer 2 after a predetermined amount of time elapses following the game start time, the lobby server 13 decides that the member who has not accessed the game loses the game by default, and decides that the member who has accessed the game wins the game by default.

In this way, the member who participates in the game can win after a predetermined amount of time, and so an excessive burden is not applied to the member who participated in the game, and the member who does not participate in the game loses for the number of games not participated in, so an appropriate penalty can be assigned to a member who does not participate in the game, and baseball games played as net games can progress more smoothly.

In the above description, a case in which a member who pays a predetermined fee to play a net game was described, but the present invention can be applied in the same way to a case in which unspecified users pay a fee using a prepaid card or when a net game can be played free of charge, whereby the same effect can be obtained.

According to the present embodiment, a personal computer is used as the terminal device, but other terminal devices, such as a portable telephone and portable information terminal, may be used as long as the net game can be played thereon. A personal computer may be used for the net game itself, and a portable telephone may be used for registration to the normal pennant and for the creation of and registration to the friend pennant.

Information to be transmitted and received between the server system 1 and the client computer 2 may be encrypted using a known encryption technology. In this case, the security of each piece of information to be transmitted can be improved.

A summit league may be created from the members who reach the top in normal pennants, so that a summit pennant, where league baseball games are played by summit leagues, is played and a winner is decided.

In summary, the present invention relates to a server device for net games which is communicably connected via a network to a plurality of terminal devices used by users, and manages a game played in a game space by the users using these terminal devices. The server device for the present invention comprises: league creating means for designating as league members a predetermined number of users from a plurality of users using the terminal devices and sequentially creating a league which consists of the designated league members; and schedule deciding means for deciding the schedule of league matches so that each league member of the league created by the league creating means can play at least game with all the other league members.

According to the above described structure, the server device for network games, which is communicably connected via a network to a plurality of terminal devices used by users and manages a game played in a game space by the users using the terminal devices, comprises league creating means for designating a predetermined number of users from a plurality of users using the terminal devices as league members, and sequentially creating a league which consists of the designated members, and schedule deciding means for deciding the schedule of league matches so that each member of the league created by the league creating means can play a game with all the other members at least once.

In other words, a predetermined number of users are designated as league members from a plurality of users using the terminal devices, a league which consists of the designated members is sequentially created, and the schedule of league matches is decided so that each member of the created league plays a game with all the other members at least once. In this way, a league is sequentially created for a plurality of users, so many users can participate in one of these leagues. Also the schedule of league baseball games is decided so that each league member can play a game with all the other league members at least once, so the user to be a member of the league can continuously play games according to the schedule of the league matches. Therefore the user can use complicated strategies with variation considering a plurality of games to be played continuously. Also the opponents are limited to league members who belong to the same league rather than unspecified opponents who differ from game to game, so the user can play a plurality of games with opponents specified as members of the league.

In addition, many users can participate in one of the leagues which are sequentially created, so the advantage of net games where many users can participate is not excessively diminished, and complicated strategies with variation can be used for a plurality of games played consecutively, so more excitement can be given to the users, and also a plurality of games can be played with an opponent specified as a member of the league, so a sufficient sense of accomplishment as a winner of a league match can be given to the user.

The present invention may further comprise storing means for storing a creation keyword which a user sends using the terminal device, wherein the aforementioned league creating means creates a limited membership league in which only a user who sends a creation keyword which matches the creation keyword stored in the storing means becomes a league member.

According to the above described features, the server for net games further comprises storing means for storing a creation keyword which a user sends using the terminal device, wherein the league creating means for creating a league creates a limited membership league in which only a user who sends a creation keyword which matches the creation keyword stored in the storing means becomes a league member.

In other words, a creation keyword, which a user sends using the terminal device for creating a limited membership league, is stored in the storing means, and only a user who sends a creation keyword which matches the creation keyword stored in the storing means becomes a league member.

In this way, in order to create a limited membership league in which membership is limited, each member of the limited membership league must know the creation keyword in advance, and the league members are limited to acquaintances who knew each other before forming the limited membership league. Accordingly, acquaintances can decide a creation keyword in advance, and can create a limited membership league using this creation keyword, and therefore the user can play a game as a net game together with acquaintances who wish to play a league match.

In a net game, the user can participate in the game voluntarily, and therefore a case can be envisioned in which an opponent does not access on the time and day when the league match is played, meaning the league match cannot be played. However, in the case of the aforementioned limited membership league, the league members know each other, so the incentive to participate in the league match can be increased. As a result, acquaintances who desire to play league matches can play a game together, so the excitement of the game can be improved, and also incentives to participate in a league baseball game can be increased, so a league baseball game can be played smoothly as a net game.

In addition, the present invention may further comprise keyword transmitting means wherein, when one of the users acts as a sponsor to send the electronic mail address of another user who the sponsor-user wants to have participate in the limited membership league, along with the creation keyword, using the terminal device, the creation keyword is transmitted by electronic mail using the transmitted electronic mail address.

According to the aforementioned features, the server device for net games further comprises keyword transmitting means wherein when one of the users who acts as a sponsor to send an electronic mail address of another user who the sponsor-user wants to have participate in the limited membership league along with the creation keyword using the terminal device, the creation keyword is transmitted by electronic mail using the transmitted electronic mail address.

In other words, when one of the users wants to form a limited membership league as a sponsor of the league, the creation keyword, which is decided by the sponsor-user, can be automatically transmitted by electronic mail to acquaintances whom this user wants to become members of the limited membership league. As a result, the creation keyword can be automatically sent to an acquaintance to be a league member of the limited membership league, so it is unnecessary to inform the acquaintance of the creation keyword separately, and the limited membership league can be formed conveniently and easily.

Furthermore, the present invention may further comprise league canceling means, wherein the storing means stores a canceling keyword which the user transmits using the terminal device, and when the user transmits a canceling keyword which matches the canceling keyword stored in the storing means, the limited membership league created by the league creating means is canceled.

According to the aforementioned features, the storing means for storing a creation keyword stores a canceling keyword transmitted by a user, and the server device for net games further comprises league canceling means for canceling the limited membership league created by the league creating means when the user transmits a canceling keyword which matches the canceling keyword stored in the storing means.

In other words, a canceling keyword, which the user transmits using the terminal device to cancel a limited membership league, is stored in the storing means, and when the user transmits a canceling keyword which matches the canceling keyword stored in the storing means, the created limited membership league is canceled. In this way, in order to cancel a limited membership league, a canceling keyword must be known in advance, and only a user who knows the canceling keyword can be assigned the right to cancel the limited membership league. Furthermore, since a limited membership league once formed can be canceled in accordance with the wishes of a user, the choice of users to participate in net games can be expanded. As a result, the right to cancel the limited membership league can be assigned only to a user who knows the canceling keyword, so the security of the limited membership league can be assured, and also the choice of the users when participating in a net game can be expanded, so the advantage of a net game in which users can participate voluntarily is not excessively diminished.

The present invention may include the feature that when a user who transmits a canceling keyword chooses to participate in a normal league of which league members are automatically decided by the league creating means, the league canceling means cancels the limited membership league created by the league creating means, and the league creating means creates a normal league of which this user and other arbitrarily selected users are members.

According to the above described features, when the user who transmits the canceling keyword in order to cancel the limited membership league chooses to participate in a normal league in which members are automatically decided by the league creating means, the league canceling means cancels the limited membership league created by the league creating means, and the league creating means creates a normal league of which this user and other arbitrarily selected users are members.

In other words, when the user who transmits the canceling keyword selects to participate in a normal league in which members are automatically decided, the created limited membership league is canceled and a normal league of which this user and other arbitrarily selected users are members is created. In this way, when a user who tries to form a limited membership league cannot form the limited membership league due to a reason such as other users to be league members not participating, the user can cancel the created limited membership league, and can automatically participate in a normal league. As a result, when a limited membership league cannot be formed, the limited membership league is cancelled and the members can automatically participate in a normal league, so the choice of leagues in which the user can participate in can be expanded, and the users can participate in a normal league easily.

The present invention may further comprise game schedule notifying means for giving notification by electronic mail of the game schedule decided by the schedule deciding means to each member of the league created by the league creating means.

According to the above described features, the server device for net games further comprises game schedule notifying means for giving notification by electronic mail of the game schedule decided by the schedule deciding means to each member of the league created by the league creating means. In other words, the game schedule of the league matches is automatically notified to each member of the league, so each member can learn the game schedule of the league match in advance. As a result, each member of the league can know the game schedule of the league baseball games in advance, so the probability that each league member will participate in each game according to the game schedule can be increased.

The present invention may further comprise outcome deciding means wherein, when one of the users who is supposed to participate in a game does not access the game using the terminal device after a predetermined amount of time elapses following the game start time, which is specified according to the game schedule decided by the schedule deciding means, it is decided that the user who has not accessed the game loses the game by default.

According to the above described feature, the server device for net games further comprises outcome deciding means wherein, when one of the users who is supposed to participate in a game does not access the game using the terminal device after a predetermined amount of time elapses following the game start time, which is specified according to the game schedule decided by the schedule deciding means, it is decided that the user who has not accessed the game loses the game by default.

In other words, when one of the users who is supposed to participate in a game does not access the game using the terminal device after a predetermined amount of time elapses following the game start time, it is decided that the user who has not accessed the game loses the game by default. Since a net game has a characteristic in which users can participate voluntarily, it is foreseeable that a member of the league does not participate in a game. The handling of such a case is important in the management of net games, and by deciding the outcome of the game as described above, the user who participates in a game can win the game after a predetermined amount of time has elapsed, so an excessive burden is not placed on the user who participated in the game. A user who does not participate in a game loses that game, so an appropriate penalty may be dealt to the user who does not participate in the game. As a result, an appropriate penalty can be assigned to a user who does not participate in a game, without applying an excessive burden on the user who does participate in the game, so games played by net games can progress smoothly.

The present invention may include the following feature that the schedule deciding means decides the game schedule based on the desired start time requested by the user.

According to the above described feature, the schedule deciding means for deciding the schedule of the league baseball games decides the game schedule based on the desired start time requested by the user.

In other words, the game schedule is decided based on the desired start time requested by the user, so the user can play a game at a convenient time, a resulting in an improvement in the participation rate in the league matches. As a result, the participation rate in league matches can be increased, so a league match can be played more smoothly as a net game.

The invention also relates to a net game management method using a server device for net games, which is communicably connected via a network to a plurality of terminal devices used by users, and manages a game played in a game space by the users using these terminal devices. The method comprises a league creating step in which the server device for net games designates a predetermined number of users from the plurality of users using the terminal devices as league members, and creates a league which consists of the designated league members, and a schedule deciding step in which the server device for net games decides a schedule of league matches so that each member of the league created in the league creating step plays a game with all the other members at least once.

According to the above form of the invention, the net game management method using the server device for net games, which is communicably connected via a network to a plurality of terminal devices used by users and manages a game played in a game space by the users using the terminal devices, comprising a league creating step in which the server device for net games designates a predetermined number of users from the plurality of users using the terminal devices as league members and creates a league which consists of the designated league members, and a schedule deciding step in which the server device for net games decides a schedule of league matches so that each member of the league created in the league creating step can play a game with all the other league members at least once.

In other words, a predetermined number of users from the plurality of users using the terminal devices are designated as league members by the server device for net games, a league which consists of the designated league members is sequentially created, and the schedule of the league matches is decided so that each member of the created league plays with all the other league members at least once.

In this way leagues are created sequentially for a plurality of users, so many users can participate in one of these leagues. Also the schedule of league matches is decided so that each league member can play a game with all the other league members at least once, and thus the user to be a league member can play consecutive games according to the schedule of the league matches. Therefore the user can use complicated strategies with variation after considering the plurality of games to be played consecutively. Thus, opponents are limited to league members who belong to the same league rather than unspecified general opponents who differ for each game, so the user can play a plurality of games with opponents specified as members of the league. As a result, many users can participate in one of the sequentially created leagues, so the advantage of net games, where many users can participate, is not excessively diminished, and also complicated strategies with variation can be used for a plurality of consecutively played games, so more excitement can be given to users, and also a plurality of games can be played with an opponent specified as a member of the league, therefore a sufficient sense of accomplishment as a winner can be given to the user when the user wins a league baseball game.

The invention further relates to a net game management program for causing a server device for net games, which is communicably connected to a plurality of terminal devices used by users via a network and manages a game played in a game space by the users using the terminal devices, to function as league creating means for designating a predetermined number of users from a plurality of users using the terminal devices as league members and creating a league which consists of the designated league members, and schedule deciding means for deciding a schedule of league matches so that each member of the league created by the league creating means can play a game with all the other league members at least once.

According to the above form of the invention, the net game management program causes the server device for net games, which is communicably connected to a plurality of terminal devices used by users via a network and manages a game played in a game space using the terminal devices, to function as league creating means for designating a predetermined number of users from the plurality of users using the terminal devices as league members and creating a league which consists of the designated league members, and schedule deciding means for deciding a schedule of league matches so that each member of the league created by the league creating means plays a game with all the other league members at least once.

In other words, a predetermined number of users from the plurality of users using the terminal devices are designated league members by the server device for net games, a league which consists of the designated league members is sequentially created, and the schedule of the league matches is decided so that each member of the created league plays a game with all the other league members at least once.

In this way, leagues are created sequentially for a plurality of users, so many users can participate in one of these leagues. Also, the schedule of the league matches is decided so that each league member can play a game with all the other members at least once, and thus the user to be a member of the league can play consecutive games according to the schedule of the league matches. Therefore the user can use complicated strategies with variation after considering the plurality of games to be played consecutively. Also, opponents are limited to members of the league who belong to the same league rather than unspecified general opponents who differ for each game, so the user can play a plurality of games with opponents specified as members of the league. As a result, many users can participate in one of the sequentially created leagues, so the advantage of net games, where many users can participate, is not excessively diminished, and also complicated strategies with variation can be used for a plurality of consecutively played games, so more excitement can be given to users, and also a plurality of games can be played with an opponent specified as a member of the league, therefore a sufficient sense of accomplishment as a winner can be given to the user when the user wins a league baseball game.

This application is based on Japanese Patent Application Serial No. 2001-161341 filed in Japan Patent Office on May 29, 2001, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A server device for net games which is communicably connected via a network to a plurality of terminal devices used by users, and manages a game played in a game space by the users using said terminal devices, said server device comprising:

league creating means for designating a predetermined number of users from a plurality of users using said terminal devices as league members, and sequentially creating a league which consists of the designated members; and schedule deciding means for deciding a schedule of league matches so that each league member of the league created by said league creating means plays at least one game with all other ones of the league members;

storing means for storing a creation keyword which is sent by a user using said terminal device of the user, wherein said league creating means creates a limited membership league where only a user who sends a keyword which matches the creation keyword stored in said storing means becomes a league member, and said storing means stores a cancelling keyword transmitted by a user using said terminal device; and league canceling means for canceling the limited membership league created by said league creating means when the user transmits the canceling keyword which matches the canceling keyword stored in said storing means, wherein when the user who transmits said canceling keyword selects to participate in a normal league of which league members are automatically decided by said league creating means, said league canceling means cancels the limited membership league created by said league creating means, and said league creating means creates a normal league of which said user and other arbitrarily selected users are members.

2. The server device according to claim 1, further comprising keyword transmitting means, which, when one of the users acts as a sponsor to transmit an electronic mail address of another user whom the sponsor-user warns to have participate in said limited membership league, along with said creation keyword, using said terminal device, transmits said creation keyword by electronic mail using the transmitted electronic mail address.

3. The server device according to claim 1, further comprising game schedule notifying means for notifying the game schedule decided by said schedule deciding means by electronic mail to each member of the league created by said league creating means.

4. The server device according to claim 1, further comprising outcome deciding means wherein, when one of the users scheduled to participate in said game does not access the game using said terminal device after a predetermined amount of time elapse following the game start time which is specified according to the game schedule decided by said schedule deciding means, it is decided that the user who has not accessed the game loses the game by default.

5. The server device according to claim 1, wherein said schedule deciding means decides the game schedule based on a desired start time requested by a user.

6. A net game management program for causing a server device for net games, which is communicably connected via a network to a plurality of terminal devices used by users, and manages a game played in a game space by the users using said terminal devices, to function as:

league creating means for designating a predetermined number of users from a plurality of users using said terminal devices as league members, and creating a league which consists of the designated league members;

schedule deciding means for deciding a schedule of league matches so that each member of the league created by said league creating means plays a game with all other ones of the league members at least once;

storing means for storing a creation keyword which is sent by a user using said terminal device of the user, wherein said league creating means creates a limited membership league where only a user who sends a keyword which matches the creation keyword stored in said storing means becomes a league member, and said storing means stores a cancelling keyword transmitted by a user using said terminal device; and league canceling means for canceling the limited membership league created by said league creating means when the user transmits a canceling keyword which matches the canceling keyword stored in said storing means, wherein when the user who transmits said canceling keyword selects to participate in a normal league of which league members are automatically decided by said league creating means, said league canceling means cancels the limited membership league created by said league creating means, and said league creating means creates a normal league of which said user and other arbitrarily selected users are members.

7. A recording medium which stores a net game management program, said net game management program causing a sewer device for net games, which is communicably connected via a network to a plurality of terminal devices used by users, and manages a game played in a game space by the users using said terminal devices, to function as:

league creating means for designating a predetermined number of users from a plurality of users using said terminal devices as league members, and creating a league which consists of the designated league members;

schedule deciding means for deciding a schedule of league matches so that each member of the league created by said league creating means plays a game with all other ones of the league members at least once;

storing means for storing a creation keyword which is sent by a user using said terminal device of the user, wherein said league creating means creates a limited membership league where only a user who sends a keyword which matches the creation keyword stored in said storing means becomes a league member, and said storing means stores a cancelling keyword transmitted by a user using said terminal device; and league canceling means for canceling the limited membership league created by said league creating means when the user transmits a canceling keyword which matches the canceling keyword stored in said scoring means, wherein when the user who transmits said canceling keyword selects to participate in a normal league of which league members are automatically decided by said league creating means, said league canceling means cancels the limited membership league created by said league creating means, and said league creating means creates a normal league of which said user and other arbitrarily selected users are members.

* * * * *